(12) United States Patent
Zhu et al.

(10) Patent No.: US 12,369,206 B2
(45) Date of Patent: Jul. 22, 2025

(54) BLUETOOTH CONNECTION METHOD AND RELATED APPARATUS

(71) Applicant: HUAWEI TECHNOLOGIES CO., LTD., Guangdong (CN)

(72) Inventors: Yuhong Zhu, Shanghai (CN); Fei Zheng, Dongguan (CN); Junfeng Lu, Shenzhen (CN); Guanjun Ni, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 609 days.

(21) Appl. No.: 17/640,569

(22) PCT Filed: Sep. 2, 2020

(86) PCT No.: PCT/CN2020/113048
§ 371 (c)(1),
(2) Date: Mar. 4, 2022

(87) PCT Pub. No.: WO2021/043170
PCT Pub. Date: Mar. 11, 2021

(65) Prior Publication Data
US 2022/0330359 A1    Oct. 13, 2022

(30) Foreign Application Priority Data
Sep. 6, 2019    (CN) .......................... 201910844164.5

(51) Int. Cl.
*H04W 76/10* (2018.01)
*H04W 4/80* (2018.01)
(Continued)

(52) U.S. Cl.
CPC ............. *H04W 76/14* (2018.02); *H04W 4/80* (2018.02); *H04W 48/16* (2013.01); *H04W 68/02* (2013.01)

(58) Field of Classification Search
None
See application file for complete search history.

(56) References Cited

U.S. PATENT DOCUMENTS

2004/0092249 A1* 5/2004 Sugikawa ............. H04L 61/301
                                                              455/411
2008/0125106 A1    5/2008 Lee et al.
(Continued)

FOREIGN PATENT DOCUMENTS

CN    2591155 Y    12/2003
CN    1777321 A    5/2006
(Continued)

OTHER PUBLICATIONS

Mao Dongjie, Design of BLE Based System on Chip for SEMG Acquisition and Transmission System, 2018, 2 pages (abstract).
(Continued)

*Primary Examiner* — Minh Trang T Nguyen
(74) *Attorney, Agent, or Firm* — WOMBLE BOND DICKINSON (US) LLP

(57) ABSTRACT

This application discloses a Bluetooth connection method, and relates to the field of short-range wireless communications technologies. The method includes: A terminal sends a service inquiry request to a Bluetooth device after the terminal and the Bluetooth device establish an asynchronous connectionless ACL link. The service inquiry request includes information about a service supported by the terminal. The Bluetooth device sends a service inquiry response to the terminal in response to the service inquiry request. The service inquiry response includes information about a service supported by the Bluetooth device. The terminal performs pairing with the Bluetooth device after the terminal receives the service inquiry response sent by the Bluetooth device. The terminal establishes a connection based on a first service to the Bluetooth device when both (Continued)

the terminal and the Bluetooth device support the first service. This reduces a period of time for establishing a Bluetooth service connection.

17 Claims, 25 Drawing Sheets

(51) Int. Cl.
*H04W 48/16* (2009.01)
*H04W 68/02* (2009.01)
*H04W 76/14* (2018.01)

(56) References Cited

U.S. PATENT DOCUMENTS

| | | | |
|---|---|---|---|
| 2009/0034498 | A1 | 2/2009 | Banerjea et al. |
| 2011/0117848 | A1 | 5/2011 | Tanaka |
| 2011/0281519 | A1 | 11/2011 | Reuss et al. |
| 2016/0366263 | A1* | 12/2016 | Song ............... H04R 25/554 |
| 2017/0372055 | A1 | 12/2017 | Robinson et al. |
| 2018/0341448 | A1* | 11/2018 | Behzadi ............ H04M 1/6066 |
| 2019/0215673 | A1* | 7/2019 | Choi ................ H04L 47/20 |
| 2019/0373430 | A1* | 12/2019 | Srivatsa ............... H04W 4/80 |
| 2020/0053611 | A1* | 2/2020 | Jorgovanovic ..... H04W 36/0027 |
| 2020/0221359 | A1* | 7/2020 | Srivastava ............ H04W 4/80 |

FOREIGN PATENT DOCUMENTS

| | | |
|---|---|---|
| CN | 101141150 A | 3/2008 |
| CN | 101442832 A | 5/2009 |
| CN | 101867572 A | 10/2010 |
| CN | 102946402 A | 2/2013 |
| CN | 105338402 A | 2/2016 |
| CN | 106900079 A | 6/2017 |
| CN | 108243278 A | 7/2018 |

OTHER PUBLICATIONS

Guo Hengjiang, Design and Implementation of Bluetooth Audio Access System, 2007, 2 pages (abstract).
Gpa WG et al.,"Battery Service Specification",Dec. 27, 2011,total:13pages.
Anonymous:"ESP32 Service for Battery BLE Server GATT Level Indication",Oct. 23, 2018 (Oct. 23, 2018),total:16pages.
Bluetooth SIG: Signaling Packet Formats for L2CAP echo request (0×08) and echo response (0×09) ,Dec. 6, 2016 (Dec. 6, 2016),toal:3pages.

* cited by examiner

BLUETOOTH CONNECTION METHOD AND RELATED APPARATUS

CROSS-REFERENCE TO RELATED APPLICATIONS

This application is a national stage of International Application No. PCT/CN2020/113048, filed on Sep. 2, 2020, which claims priority to Chinese Patent Application No. 201910844164.5, filed on Sep. 6, 2019. Both of the aforementioned applications are hereby incorporated by reference in their entireties.

TECHNICAL FIELD

This application relates to the field of short-range wireless communications technologies, and in particular, to a Bluetooth connection method and a related apparatus.

BACKGROUND

With development of wireless communications technologies, people are accustomed to connecting different intelligent terminal devices in a wireless manner. As a current mature short-range wireless communications technology, a Bluetooth technology is widely applied to intelligent terminal devices. For example, a smartphone is connected to a Bluetooth device such as a Bluetooth headset or a Bluetooth speaker through Bluetooth.

Currently, after completing Bluetooth authorization and authentication, the smartphone and the Bluetooth device need to perform service inquiry based on a service discovery protocol (SDP). The smartphone may inquire, based on the SDP, about a service function supported by the Bluetooth device. The Bluetooth device may also learn, based on the SDP, of a service function supported by the smartphone. Only after confirming that the peer device supports a service function, the smartphone can establish a service connection based on the service function to the Bluetooth device. For example, only when the smartphone finds, through inquiry based on the SDP, that the Bluetooth device supports a call function, the smartphone can establish a service connection based on the call function to the Bluetooth device.

However, when performing service inquiry based on the SDP, the smartphone and the Bluetooth device need to establish a logical link control and adaptation protocol (L2CAP)-based dynamic channel, and delete the L2CAP-based dynamic channel after completing the SDP inquiry. Consequently, a large amount of time is consumed.

SUMMARY

This application provides a Bluetooth connection method and a related apparatus, so that when an asynchronous connectionless (ACL) link connection is established, an information exchange such as an SDP service inquiry and capability negotiation is completed by using two signaling types: an echo request and an echo response on an L2CAP signaling channel, to omit a process such as establishing an L2CAP dynamic channel used for the SDP service inquiry, and reduce a period of time for establishing a Bluetooth service connection.

According to a first aspect, this application provides a Bluetooth connection method. The method is applied to a Bluetooth system, the Bluetooth system includes a terminal and a Bluetooth device, and the method includes: The terminal sends a service inquiry request to the Bluetooth device after the terminal and the Bluetooth device establish an asynchronous connectionless ACL link. The service inquiry request includes information about a service supported by the terminal. The Bluetooth device sends a service inquiry response to the terminal in response to the service inquiry request. The service inquiry response includes information about a service supported by the Bluetooth device. The terminal performs pairing with the Bluetooth device after the terminal receives the service inquiry response sent by the Bluetooth device. The terminal establishes a connection based on a first service to the Bluetooth device when both the terminal and the Bluetooth device support the first service.

According to an embodiment of the application, an information exchange such as an SDP service inquiry and capability negotiation may be completed when the ACL link is established and before pairing, to omit a process such as establishing an L2CAP dynamic channel used for the SDP service inquiry, and reduce a period of time for establishing a Bluetooth service connection.

In an embodiment, that the terminal sends a service inquiry request to the Bluetooth device includes: The terminal sends the service inquiry request to the Bluetooth device by using logical link control and adaptation protocol L2CAP echo request signaling.

In an embodiment, that the Bluetooth device sends a service inquiry response to the terminal includes: The Bluetooth device sends the service inquiry response to the terminal by using L2CAP echo response signaling.

In this way, the SDP service inquiry is completed based on an echo request command and an echo response command, to omit the process of establishing the L2CAP dynamic channel used for the SDP service inquiry, and reduce the period of time for establishing the service connection.

In an embodiment, the method further includes: When the ACL link established between the terminal and the Bluetooth device is encrypted, the Bluetooth device sends first battery level information of the Bluetooth device to the terminal by using L2CAP echo request signaling; and the terminal displays the first battery level information after receiving the first battery level information.

In an embodiment, the method further includes: When a battery level of the Bluetooth device satisfies a preset change, the Bluetooth device sends second battery level information of the Bluetooth device to the terminal by using L2CAP echo request signaling; and the terminal displays the second battery level information after receiving the second battery level information.

In this way, the Bluetooth device may report battery level information based on the echo request command, to omit the process of establishing the L2CAP dynamic channel and a process of establishing an RFCOMM data channel used to report the battery level, and reduce a period of time in which the terminal obtains the battery level reported by the Bluetooth device.

In an embodiment, the method further includes: After receiving the first battery level information or the second battery level information sent by the Bluetooth device, the terminal sends a battery level receiving response to the Bluetooth device by using L2CAP echo response signaling. The battery level receiving response is used by the Bluetooth device to confirm that the terminal has received the first battery level information or the second battery level information of the Bluetooth device. In this way, the Bluetooth device may determine whether the terminal receives the battery level information.

In an embodiment, the method further includes: The terminal sends a private parameter of the terminal to the Bluetooth device by using L2CAP echo request signaling or L2CAP echo response signaling. The private parameter of the terminal includes audio scene information and/or user scene information of the terminal and/or a device type of the terminal.

In an embodiment, the method further includes: The Bluetooth device sends a private parameter of the Bluetooth device to the terminal by using L2CAP echo request signaling or L2CAP echo response signaling. The private parameter of the Bluetooth device includes wearing detection information of the Bluetooth device and/or a device type of the Bluetooth device.

In this way, the terminal and the Bluetooth device may exchange private parameter information based on the echo request command and the echo response command, to omit the process of establishing the L2CAP dynamic channel and a process of establishing an RFCOMM data channel used for an SPP, and reduce a period of time in which the terminal and the Bluetooth device exchange the private parameter information.

According to a second aspect, this application provides a Bluetooth system, including a terminal and a Bluetooth device. The terminal is configured to send a service inquiry request to the Bluetooth device after the terminal and the Bluetooth device establish an asynchronous connectionless ACL link. The service inquiry request includes information about a service supported by the terminal. The Bluetooth device is configured to send a service inquiry response to the terminal in response to the received service inquiry request. The service inquiry response includes information about a service supported by the Bluetooth device. The terminal is further configured to perform pairing with the Bluetooth device after receiving the service inquiry response. The terminal is further configured to establish a connection based on a first service to the Bluetooth device when both the terminal and the Bluetooth device support the first service.

According to an embodiment of the application, an information exchange such as an SDP service inquiry and capability negotiation may be completed when the ACL link is established and before pairing, to omit a process such as establishing an L2CAP dynamic channel used for the SDP service inquiry, and reduce a period of time for establishing a Bluetooth service connection.

In an embodiment, the terminal is configured to send the service inquiry request to the Bluetooth device by using logical link control and adaptation protocol L2CAP echo request signaling.

In an embodiment, the Bluetooth device is configured to send the service inquiry response to the terminal by using logical link control and adaptation protocol L2CAP echo response signaling.

In this way, the SDP service inquiry is completed based on an echo request command and an echo response command, to omit the process of establishing the L2CAP dynamic channel used for the SDP service inquiry, and reduce the period of time for establishing the service connection.

In an embodiment, the Bluetooth device is further configured to: when the ACL link established between the Bluetooth device and the terminal is encrypted, send first battery level information of the Bluetooth device to the terminal by using L2CAP echo request signaling; and the terminal is further configured to display the first battery level information after receiving the first battery level information.

In an embodiment, the Bluetooth device is further configured to: when a battery level of the Bluetooth device satisfies a preset change, send second battery level information of the Bluetooth device to the terminal by using L2CAP echo request signaling; and the terminal is further configured to display the second battery level information after receiving the second battery level information.

In this way, the Bluetooth device may report battery level information based on the echo request command, to omit the process of establishing the L2CAP dynamic channel and a process of establishing an RFCOMM data channel used to report the battery level, and reduce a period of time in which the terminal obtains the battery level reported by the Bluetooth device.

In an embodiment, the terminal is further configured to: after receiving the first battery level information or the second battery level information sent by the Bluetooth device, send a battery level receiving response to the Bluetooth device by using L2CAP echo response signaling. The battery level receiving response is used by the Bluetooth device to confirm that the terminal has received the first battery level information or the second battery level information of the Bluetooth device. In this way, the Bluetooth device may determine whether the terminal receives the battery level information.

In an embodiment, the terminal is further configured to send a private parameter of the terminal to the Bluetooth device by using L2CAP echo request signaling or L2CAP echo response signaling. The private parameter of the terminal includes audio scene information and/or user scene information of the terminal and/or a device type of the terminal.

In an embodiment, the Bluetooth device is further configured to send a private parameter of the Bluetooth device to the terminal by using L2CAP echo request signaling or L2CAP echo response signaling. The private parameter of the Bluetooth device includes wearing detection information of the Bluetooth device and/or a device type of the Bluetooth device.

In this way, the terminal and the Bluetooth device may exchange private parameter information based on the echo request command and the echo response command, to omit the process of establishing the L2CAP dynamic channel and a process of establishing an RFCOMM data channel used for an SPP, and reduce a period of time in which the terminal and the Bluetooth device exchange the private parameter information.

According to a third aspect, this application provides a terminal, including a Bluetooth chip, a memory, a touchscreen, and a processor. The memory is coupled to the processor, and the Bluetooth chip supports a classic Bluetooth BR/EDR function. The Bluetooth chip is configured to send a service inquiry request to a Bluetooth device after the terminal and the Bluetooth device establish an asynchronous connectionless ACL link. The service inquiry request includes information about a service supported by the terminal. The Bluetooth chip is further configured to receive a service inquiry response sent by the Bluetooth device. The service inquiry response includes information about a service supported by the Bluetooth device. The Bluetooth chip is further configured to perform pairing with the Bluetooth device after receiving the service inquiry response. The Bluetooth chip is further configured to establish a connection based on a first service to the Bluetooth device when both the terminal and the Bluetooth device support the first service.

According to an embodiment of the application, an information exchange such as an SDP service inquiry and capability negotiation may be completed when the ACL link is established and before pairing, to omit a process such as establishing an L2CAP dynamic channel used for the SDP service inquiry, and reduce a period of time for establishing a Bluetooth service connection.

In an embodiment, the Bluetooth chip is configured to send the service inquiry request to the Bluetooth device by using logical link control and adaptation protocol L2CAP echo request signaling.

In an embodiment, the Bluetooth chip is configured to receive the service inquiry response sent by the Bluetooth device by using L2CAP echo response signaling.

In this way, the SDP service inquiry is completed based on an echo request command and an echo response command, to omit the process of establishing the L2CAP dynamic channel used for the SDP service inquiry, and reduce the period of time for establishing the service connection.

In an embodiment, the Bluetooth chip is further configured to: when the ACL link established between the terminal and the Bluetooth device is encrypted, receive first battery level information sent by the Bluetooth device by using L2CAP echo request signaling; and the processor is configured to: after the Bluetooth chip receives the first battery level information, indicate the touchscreen to display the first battery level information.

In an embodiment, the Bluetooth chip is further configured to: when a battery level of the Bluetooth device satisfies a preset change, receive second battery level information sent by the Bluetooth device by using L2CAP echo request signaling; and the processor is configured to: after the Bluetooth chip receives the second battery level information, indicate the touchscreen to display the second battery level information.

In this way, the Bluetooth device may report battery level information based on the echo request command, to omit the process of establishing the L2CAP dynamic channel and a process of establishing an RFCOMM data channel used to report the battery level, and reduce a period of time in which the terminal obtains the battery level reported by the Bluetooth device.

In an embodiment, the Bluetooth chip is further configured to: after receiving the first battery level information or the second battery level information sent by the Bluetooth device, send a battery level receiving response to the Bluetooth device by using L2CAP echo response signaling. The battery level receiving response is used by the Bluetooth device to confirm that the terminal has received the first battery level information or the second battery level information of the Bluetooth device. In this way, the Bluetooth device may determine whether the terminal receives the battery level information.

In an embodiment, the Bluetooth chip is further configured to send a private parameter of the terminal to the Bluetooth device by using L2CAP echo request signaling or L2CAP echo response signaling. The private parameter of the terminal includes audio scene information and/or user scene information of the terminal and/or a device type of the terminal.

In an embodiment, the Bluetooth chip is further configured to receive a private parameter that is of the Bluetooth device and that is sent by the Bluetooth device by using L2CAP echo request signaling or L2CAP echo response signaling. The private parameter of the Bluetooth device includes wearing detection information of the Bluetooth device and/or a device type of the Bluetooth device.

In this way, the terminal and the Bluetooth device may exchange private parameter information based on the echo request command and the echo response command, to omit the process of establishing the L2CAP dynamic channel and a process of establishing an RFCOMM data channel used for an SPP, and reduce a period of time in which the terminal and the Bluetooth device exchange the private parameter information.

According to a fourth aspect, this application provides a Bluetooth device, including a Bluetooth chip, a memory, and a processor. The memory is coupled to the processor, and the Bluetooth chip supports a classic Bluetooth BR/EDR function and a Bluetooth low energy BLE function.

The Bluetooth chip is configured to: after the Bluetooth device and a terminal establish an asynchronous connectionless ACL link, receive a service inquiry request sent by the terminal. The service inquiry request includes information about a service supported by the terminal. The Bluetooth chip is further configured to send a service inquiry response to the terminal. The service inquiry response includes information about a service supported by the Bluetooth device. The Bluetooth chip is further configured to perform pairing with the terminal after sending the service inquiry response to the terminal. The Bluetooth chip is further configured to establish a connection based on a first service to the terminal when both the Bluetooth device and the terminal support the first service.

According to an embodiment of the application, an information exchange such as an SDP service inquiry and capability negotiation may be completed when the ACL link is established and before pairing, to omit a process such as establishing an L2CAP dynamic channel used for the SDP service inquiry, and reduce a period of time for establishing a Bluetooth service connection.

In an embodiment, the Bluetooth chip is configured to receive the service inquiry request sent by the terminal by using logical link control and adaptation protocol L2CAP echo request signaling.

In an embodiment, the Bluetooth chip is configured to send the service inquiry response to the terminal by using L2CAP echo response signaling.

In this way, the SDP service inquiry is completed based on an echo request command and an echo response command, to omit the process of establishing the L2CAP dynamic channel used for the SDP service inquiry, and reduce the period of time for establishing the service connection.

In an embodiment, the Bluetooth chip is further configured to: when the ACL link established between the Bluetooth device and the terminal is encrypted, send first battery level information to the terminal by using L2CAP echo request signaling.

In an embodiment, the Bluetooth chip is further configured to: when a battery level of the Bluetooth device satisfies a preset change, send second battery level information of the Bluetooth device to the terminal by using L2CAP echo request signaling.

In this way, the Bluetooth device may report battery level information based on the echo request command, to omit the process of establishing the L2CAP dynamic channel and a process of establishing an RFCOMM data channel used to report the battery level, and reduce a period of time in which the terminal obtains the battery level reported by the Bluetooth device.

In an embodiment, the Bluetooth chip is further configured to: after sending the first battery level information or the second battery level information, receive a battery level receiving response sent by the terminal by using L2CAP echo response signaling. The battery level receiving response is used to confirm that the terminal has received the first battery level information or the second battery level information. In this way, the Bluetooth device may determine whether the terminal receives the battery level information.

In an embodiment, the Bluetooth chip is further configured to receive a private parameter that is of the terminal and that is sent by the terminal by using L2CAP echo request signaling or L2CAP echo response signaling. The private parameter of the terminal includes audio scene information and/or user scene information of the terminal and/or a device type of the terminal.

In an embodiment, the Bluetooth chip is further configured to send a private parameter of the Bluetooth device to the terminal by using L2CAP echo request signaling or L2CAP echo response signaling. The private parameter of the Bluetooth device includes wearing detection information of the Bluetooth device and/or a device type of the Bluetooth device.

In this way, the terminal and the Bluetooth device may exchange private parameter information based on the echo request command and the echo response command, to omit the process of establishing the L2CAP dynamic channel and a process of establishing an RFCOMM data channel used for an SPP, and reduce a period of time in which the terminal and the Bluetooth device exchange the private parameter information.

According to a fifth aspect, this application provides a chip system, disposed in a terminal. The chip system includes a processor and a Bluetooth chip. The Bluetooth chip is configured to send a service inquiry request to a Bluetooth device after the terminal and the Bluetooth device establish an asynchronous connectionless ACL link. The service inquiry request includes information about a service supported by the terminal. The Bluetooth chip is further configured to receive a service inquiry response sent by the Bluetooth device. The service inquiry response includes information about a service supported by the Bluetooth device. The Bluetooth chip is further configured to perform pairing with the Bluetooth device after receiving the service inquiry response. The Bluetooth chip is further configured to establish a connection based on a first service to the Bluetooth device when both the terminal and the Bluetooth device support the first service.

According to an embodiment of the application, an information exchange such as an SDP service inquiry and capability negotiation may be completed when the ACL link is established and before pairing, to omit a process such as establishing an L2CAP dynamic channel used for the SDP service inquiry, and reduce a period of time for establishing a Bluetooth service connection.

In an embodiment, the Bluetooth chip is configured to send the service inquiry request to the Bluetooth device by using logical link control and adaptation protocol L2CAP echo request signaling.

In an embodiment, the Bluetooth chip is configured to receive the service inquiry response sent by the Bluetooth device by using L2CAP echo response signaling.

In an embodiment, the Bluetooth chip is further configured to: when the ACL link established between the terminal and the Bluetooth device is encrypted, receive first battery level information sent by the Bluetooth device by using L2CAP echo request signaling; and the processor is configured to: after the Bluetooth chip receives the first battery level information, indicate the touchscreen to display the first battery level information.

In an embodiment, the Bluetooth chip is further configured to: when a battery level of the Bluetooth device satisfies a preset change, receive second battery level information sent by the Bluetooth device by using L2CAP echo request signaling; and the processor is configured to: after the Bluetooth chip receives the second battery level information, indicate the touchscreen to display the second battery level information.

In an embodiment, the Bluetooth chip is further configured to: after receiving the first battery level information or the second battery level information sent by the Bluetooth device, send a battery level receiving response to the Bluetooth device by using L2CAP echo response signaling. The battery level receiving response is used by the Bluetooth device to confirm that the terminal has received the first battery level information or the second battery level information of the Bluetooth device.

In an embodiment, the Bluetooth chip is further configured to send a private parameter of the terminal to the Bluetooth device by using L2CAP echo request signaling or L2CAP echo response signaling. The private parameter of the terminal includes audio scene information and/or user scene information of the terminal and/or a device type of the terminal.

In an embodiment, the Bluetooth chip is further configured to receive a private parameter that is of the Bluetooth device and that is sent by the Bluetooth device by using L2CAP echo request signaling or L2CAP echo response signaling. The private parameter of the Bluetooth device includes wearing detection information of the Bluetooth device and/or a device type of the Bluetooth device.

According to a sixth aspect, this application provides a chip system, disposed in a Bluetooth device. The chip system includes a processor and a Bluetooth chip. The Bluetooth chip is configured to: after the Bluetooth device and a terminal establish an asynchronous connectionless ACL link, receive a service inquiry request sent by the terminal. The service inquiry request includes information about a service supported by the terminal. The Bluetooth chip is further configured to send a service inquiry response to the terminal. The service inquiry response includes information about a service supported by the Bluetooth device. The Bluetooth chip is further configured to perform pairing with the terminal after sending the service inquiry response to the terminal. The Bluetooth chip is further configured to establish a connection based on a first service to the terminal when both the Bluetooth device and the terminal support the first service.

According to an embodiment of the application, an information exchange such as an SDP service inquiry and capability negotiation may be completed when the ACL link is established and before pairing, to omit a process such as establishing an L2CAP dynamic channel used for the SDP service inquiry, and reduce a period of time for establishing a Bluetooth service connection.

In an embodiment, the Bluetooth chip is configured to receive the service inquiry request sent by the terminal by using logical link control and adaptation protocol L2CAP echo request signaling.

In an embodiment, the Bluetooth chip is configured to send the service inquiry response to the terminal by using L2CAP echo response signaling.

In an embodiment, the Bluetooth chip is further configured to: when the ACL link established between the Bluetooth device and the terminal is encrypted, send first battery level information to the terminal by using L2CAP echo request signaling.

In an embodiment, the Bluetooth chip is further configured to: when a battery level of the Bluetooth device satisfies a preset change, send second battery level information of the Bluetooth device to the terminal by using L2CAP echo request signaling.

In an embodiment, the Bluetooth chip is further configured to: after sending the first battery level information or the second battery level information, receive a battery level receiving response sent by the terminal by using L2CAP echo response signaling. The battery level receiving response is used to confirm that the terminal has received the first battery level information or the second battery level information.

In an embodiment, the Bluetooth chip is further configured to receive a private parameter that is of the terminal and that is sent by the terminal by using L2CAP echo request signaling or L2CAP echo response signaling. The private parameter of the terminal includes audio scene information and/or user scene information of the terminal and/or a device type of the terminal.

In an embodiment, the Bluetooth chip is further configured to send a private parameter of the Bluetooth device to the terminal by using L2CAP echo request signaling or L2CAP echo response signaling. The private parameter of the Bluetooth device includes wearing detection information of the Bluetooth device and/or a device type of the Bluetooth device.

DESCRIPTION OF EMBODIMENTS

The following clearly describes the technical solutions in embodiments of this application in detail with reference to the accompanying drawings. In descriptions of embodiments of this application, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes a system architecture provided in an embodiment of this application.

Figure 1:
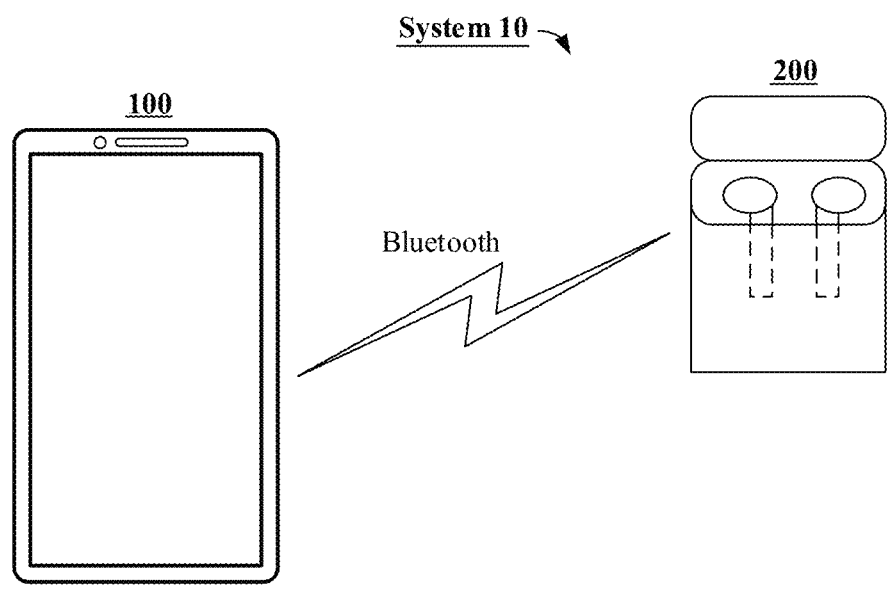
FIG. 1 is a schematic diagram of a system architecture according to an embodiment of this application.

FIG. 1 is a schematic diagram of an architecture of a system 10 according to an embodiment of this application. As shown in FIG. 1, the system 10 may include a terminal 100 and a Bluetooth device 200.

The terminal 100 and the Bluetooth device 200 may communicate by using a Bluetooth technology (including classic Bluetooth and Bluetooth low energy (BLE)). The terminal 100 may be a terminal device such as a smartphone, a tablet computer, or a personal computer. The Bluetooth device 200 may be a device that supports a Bluetooth function, for example, a Bluetooth headset, a Bluetooth speaker, or a smartwatch.

Figure 2A:
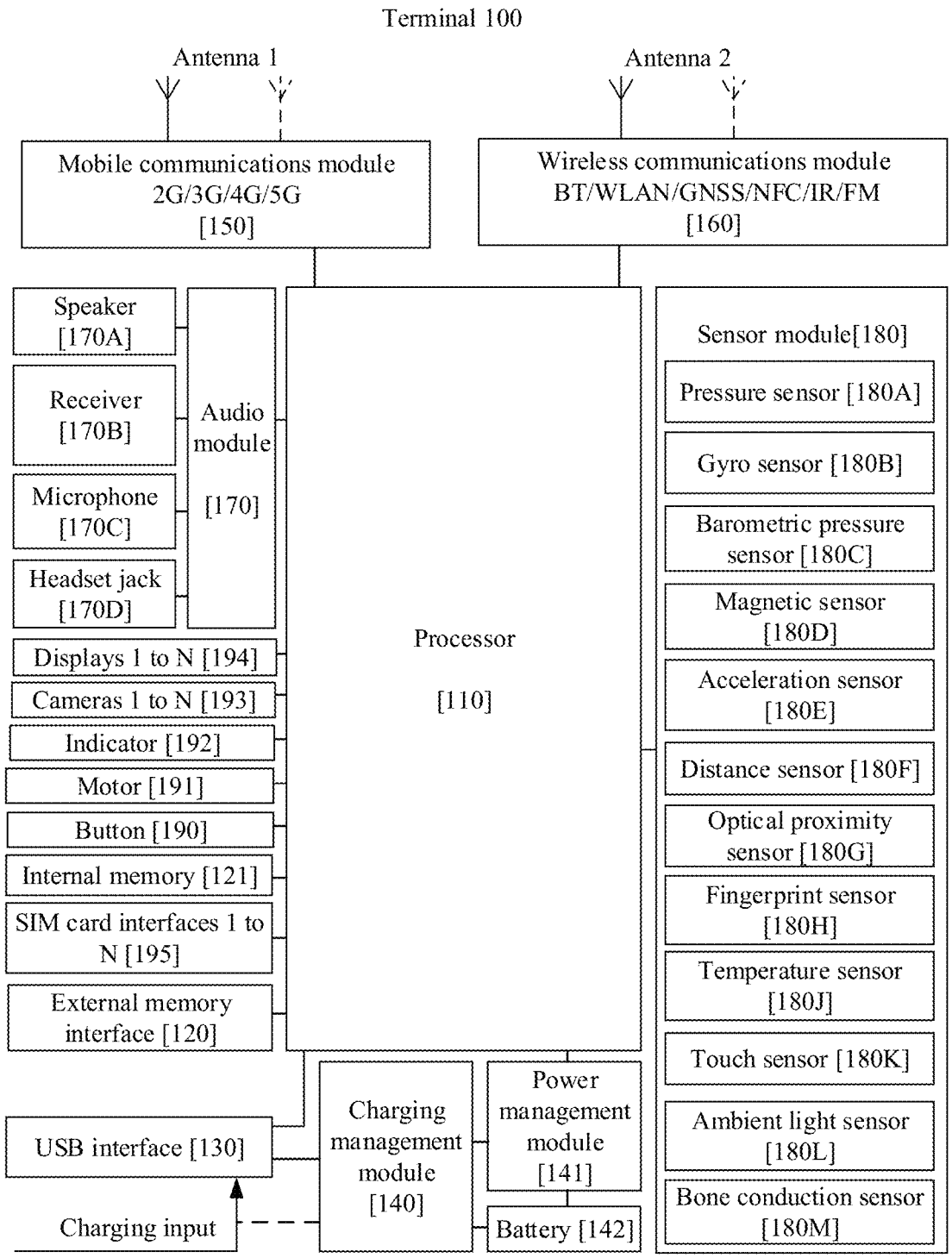
FIG. 2A is a schematic diagram of a structure of a terminal according to an embodiment of this application.

FIG. 2A is a schematic diagram of a structure of the terminal 100.

The terminal 100 is used as an example below to describe embodiments in detail. It should be understood that the terminal 100 shown in FIG. 2A is merely an example, and the terminal 100 may have more or fewer components than those shown in FIG. 2A, may combine two or more components, or may have different component configurations. Various components shown in the figure may be implemented in hardware that includes one or more signal processing and/or application-specific integrated circuits, software, or a combination of hardware and software.

The terminal 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headsetjack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an illustrated structure in an embodiment of the present application does not constitute a limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the terminal 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using the I2C interface, so that the processor 110 communicates with the touch sensor 180K by using the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to USB standard specifications, and may be specifically a mini USB interface, a micro USB interface, a USB Type-C interface, or the like. The USB interface 130 may be configured to connect to a charger to charge the terminal 100, or may be configured to transmit data between the terminal 100 and a peripheral device, or may be configured to connect to a headset, to play audio through the headset. The interface may be further configured to connect to another terminal such as an AR device.

It may be understood that an interface connection relationship between the modules that is shown in an embodiment of the present application is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communications frequency bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the terminal 100, for wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the terminal 100, for wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements the display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

The terminal 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may further process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to be connected to an external memory card such as a micro SD card, to extend a storage capability of the terminal 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a sound playing function or an image playing function), and the like. The data storage area may store data (for example, audio data and an address book) created during use of the terminal 100, and the like. In addition, the internal memory 121 may include a high-speed random access memory, and may further include a nonvolatile memory, for example, at least one magnetic disk storage device, a flash memory device, or a universal flash storage (UFS).

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode audio signals. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The terminal 100 may listen to music or answer a hands-free call by using the speaker 170A.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth, to enter a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be the USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to a first pressure threshold is performed on a Messages icon, an instruction for creating an SMS message is executed.

The gyro sensor 180B may be configured to determine a moving posture of the terminal 100. In some embodiments, angular velocities of the terminal 100 around three axes (namely, x, y, and z axes) may be determined by using the gyro sensor 180B. The gyro sensor 180B may be configured to perform image stabilization during photographing. For example, when the shutter is opened, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyro sensor 180B may be further used in a navigation scenario and a motion-sensing game scenario.

The barometric pressure sensor 180C is configured to measure barometric pressure. In some embodiments, the terminal 100 calculates an altitude by using a barometric pressure value measured by the barometric pressure sensor 180C, to assist positioning and navigation.

The magnetic sensor 180D includes a Hall effect sensor. The terminal 100 may detect opening and closing of a flip cover by using the magnetic sensor 180D. In some embodiments, when the terminal 100 is a flip phone, the terminal 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect values of accelerations of the terminal 100 in various directions (usually on three axes). When the terminal 100 is still, a value and a direction of gravity may be detected. The acceleration sensor 180E may be further configured to identify a terminal posture, and is applied to applications such as switching between landscape and portrait modes, and a pedometer.

The distance sensor 180F is configured to measure a distance. The terminal 100 may measure a distance through infrared light or a laser. In some embodiments, in a photographing scenario, the terminal 100 may use the distance sensor 180F to measure a distance, to implement fast focusing.

The optical proximity sensor 180G may include, for example, a light-emitting diode (LED) and an optical detector such as a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using a temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may also be disposed on a surface of the terminal 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 can support a nano SIM card, a micro SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external memory card. The terminal 100 interacts with a network via a SIM card, to implement functions such as calling and data communication. In some embodiments, the terminal 100 uses an eSIM, namely, an embedded SIM card. The eSIM card may be embedded in the terminal 100, and cannot be separated from the terminal 100.

Figure 2B:
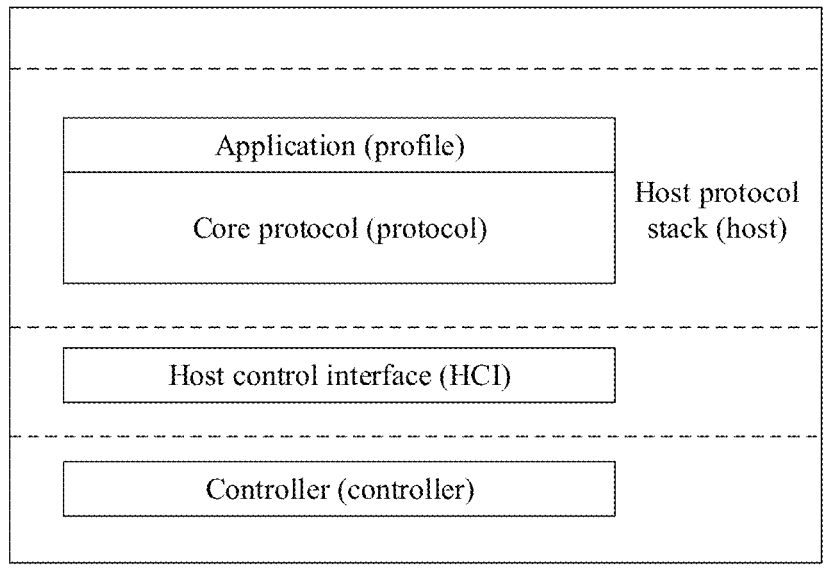
FIG. 2B is a schematic diagram of an architecture of a Bluetooth protocol according to an embodiment of this application.

As shown in FIG. 2B, an embodiment of this application provides a Bluetooth protocol framework, including but not limited to a host protocol stack (Host), a host control interface (HCl), and a controller.

The host protocol stack defines a plurality of profiles and core protocols (protocol) in a Bluetooth framework, each profile defines a corresponding message format and application rule, and the profile is a Bluetooth service (Application). To implement interconnection and interworking between different devices on different platforms, profiles such as an advanced audio distribution profile (A2DP) and a hands-free profile (HFP) are formulated for various possible and universal application scenarios in a Bluetooth protocol.

The core protocol includes but is not limited to a Bluetooth basic service protocol (service discover protocol, SDP), a logical link control and adaptation protocol (L2CAP), and the like. The core protocol is essential to the Bluetooth protocol stack.

The HCl provides an upper-layer protocol with a unified interface for entering a link manager and a unified manner for entering a baseband. Several transport layers exist between a host core protocol stack and a controller, and these transport layers are transparent and are used to complete a data transmission task. A Bluetooth special interest group (SIG) specifies four manners in which hardware is connected through a physical bus, in other words, four HCl transport layers: USB, RS-232, UART, and a PC card.

The controller defines a bottom-layer hardware part, including a radio frequency (RF), a baseband (BB), and a link manager (LM). An RF layer filters and transmits data bit streams by using microwaves on a 2.4 GHz unlicensed ISM band, and mainly defines conditions that a Bluetooth transceiver needs to meet to work properly on this frequency band. The baseband is responsible for frequency hopping and transmission of Bluetooth data and information frames. The link manager is responsible for connection, establishment, and disconnection of links, and security control. A link manager (LM) layer is a link management layer protocol of a Bluetooth protocol stack, and is responsible for translating an upper-layer HCl command into an operation acceptable to the baseband, establishing an asynchronization link (ACL) and a synchronization link (SCO), enabling a Bluetooth device to enter an operating mode in which the Bluetooth device is in an energy saving state, or the like. A link control (LC) layer is responsible for responding to an upper-layer LM command (for example, an LM command for executing a function such as establishing a data packet transmission link or maintaining a link) during a transfer of a batch of data packets.

Some content that is of a method in embodiments of this application and that is implemented by the wireless communications module 160 of the terminal 100 shown in FIG. 2A may be performed by the Bluetooth module or a Bluetooth chip.

Figure 3:
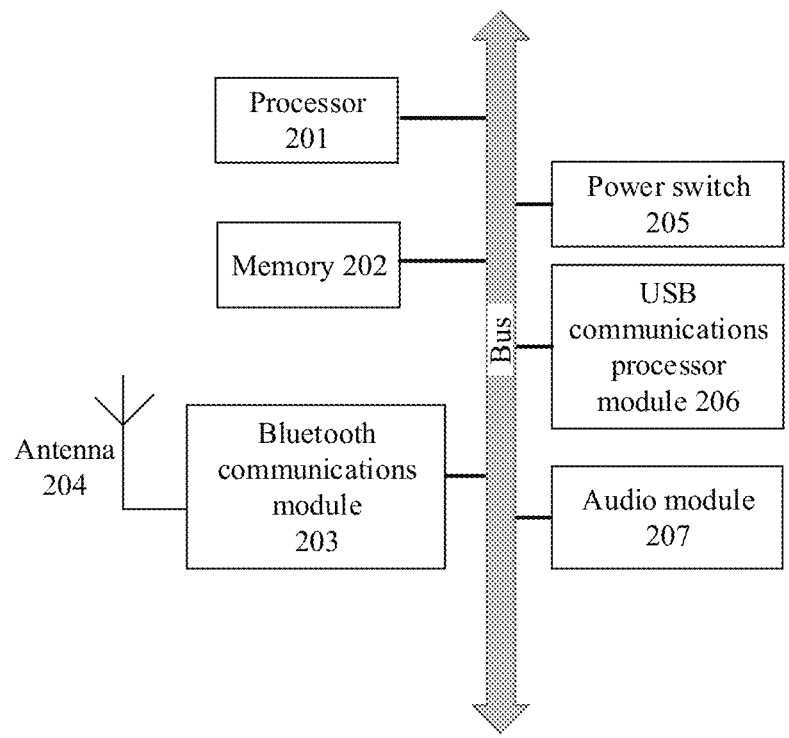
FIG. 3 is a schematic diagram of a structure of a Bluetooth device according to an embodiment of this application.

FIG. 3 is an example schematic diagram of a structure of a Bluetooth device 200 according to an embodiment of this application.

The following describes an embodiment in detail by using the Bluetooth device 200 as an example. It should be understood that, the Bluetooth device 200 shown in FIG. 3 is merely an example, and the Bluetooth device 200 may have more or less components than those shown in FIG. 3, may combine two or more components, or may have different component configurations. Various components shown in the figure may be implemented in hardware that includes one or more signal processing and/or application-specific integrated circuits, software, or a combination of hardware and software.

As shown in FIG. 3, the Bluetooth device 200 may include a processor 201, a memory 202, a Bluetooth communications module 203, an antenna 204, a power switch 205, a USB communications processing module 206, and an audio module 207.

The processor 201 may be configured to read and execute computer-readable instructions. In an embodiment, the processor 201 may mainly include a controller, an arithmetic unit, and a register. The controller is mainly responsible for decoding an instruction, and sends a control signal for an operation corresponding to the instruction. The arithmetic unit is mainly responsible for storing a register operand, an intermediate operation result, and the like that are temporarily stored during instruction execution. In an embodiment, a hardware architecture of the processor 201 may be an application-specific integrated circuit (ASIC) architecture, an MIPS architecture, an ARM architecture, an NP architecture, or the like.

In some embodiments, the processor 201 may be configured to parse a signal received by the Bluetooth communications processing module 203, for example, a pairing mode modification request sent by the terminal 100. The processor 201 may be configured to perform a corresponding processing operation based on a parsing result, for example, generate a pairing mode modification response.

The memory 202 is coupled to the processor 201, and is configured to store various software programs and/or a plurality of sets of instructions. In an embodiment, the memory 202 may include a high-speed random access memory, and may further include a nonvolatile memory, for example, one or more magnetic disk storage devices, a flash memory device, or another nonvolatile solid-state storage device. The memory 202 may store an operating system, for example, an embedded operating system such as uCOS, VxWorks, or RTLinux. The memory 202 may further store a communications program. The communications program may be used to communicate with the terminal 100, one or more servers, or another device.

The Bluetooth communications module 203 may include a classic Bluetooth (BT) module and a Bluetooth low energy (BLE) module.

In some embodiments, the Bluetooth communications module 203 may obtain, through listening, a signal, for example, a detection request or a scanning signal, transmitted by another device (for example, the terminal 100), and may send a response signal, a scanning response, or the like, so that the another device (for example, the terminal 100) can discover the Bluetooth device 200, and the Bluetooth device 200 establishes a wireless communication connection to the another device (for example, the terminal 100), and communicates with the another device (for example, the terminal 100) through Bluetooth.

In some other embodiments, the Bluetooth communications module 203 may alternatively transmit a signal, for example, broadcast a BLE signal, so that another device (for example, the terminal 100) can discover the Bluetooth device 200, and the Bluetooth device 200 establishes a wireless communication connection to the another device (for example, the terminal 100), and communicates with the another device (for example, the terminal 100) through Bluetooth.

A wireless communication function of the Bluetooth device 200 may be implemented by using the antenna 204, the Bluetooth communications module 203, a modem processor, or the like.

The antenna 204 may be configured to transmit and receive an electromagnetic wave signal. Each antenna in the Bluetooth device 200 may be used to cover a single communications frequency band or a plurality of communications frequency bands.

In some embodiments, the Bluetooth communications module 203 may have one or more antennas.

The power switch 205 may be configured to control a power supply to supply power to the Bluetooth device 200.

The USB communications processing module 206 may be configured to communicate with another device through a USB interface (not shown).

The audio module 207 may be configured to output an audio signal through an audio output interface, so that the Bluetooth device 200 can support audio playing. The audio module may be further configured to receive audio data through an audio input interface. The Bluetooth device 200 may be a media playback device, for example, a Bluetooth headset.

In some embodiments, the Bluetooth device 200 may further include a display (not shown), and the display may be configured to display an image, prompt information, or the like. The display may be a liquid crystal display (LCD), an organic light-emitting diode (OLED) display, an active-matrix organic light emitting diode (AMOLED) display, a flexible light-emitting diode (FLED) display, a quantum dot light emitting diode (QLED) display, or the like.

In some embodiments, the Bluetooth device 200 may further include a serial interface, for example, an RS-232 interface. The serial interface may be connected to another device, for example, an audio playback device such as a speaker, so that the Bluetooth device 200 and the audio playback device cooperate in playing of audio and a video.

It can be understood that the structure shown in FIG. 3 does not constitute a limitation on the Bluetooth device 200. In some other embodiments of this application, the Bluetooth device 200 may include more or fewer components than those shown in the figure, or combine some components, or split some components, or have different component arrangements. The components shown in the figure may be implemented by hardware, software, or a combination of software and hardware.

In the method in an embodiment of the application, for a Bluetooth protocol framework used by the Bluetooth device, refer to FIG. 2B. Details are not described herein again.

In a related technology, different Bluetooth devices 200 support different service functions. For example, the Bluetooth headset may support a call, and some Bluetooth wristbands may not support a call function. Therefore, in a Bluetooth standard protocol, it is specified that after the terminal 100 and the Bluetooth device 200 complete authorization and authentication, and before the terminal 100 and the Bluetooth device 200 establish a service connection, the terminal 100 needs to start a discovery protocol (service discovery protocol, SDP) to perform a service inquiry about the Bluetooth device 200. The terminal 100 performs the service inquiry about the Bluetooth device 200 by using the SDP, to learn of a service function supported by the Bluetooth device 200. Similarly, the Bluetooth device 200 may also perform a service inquiry about the terminal 100 through an SDP service inquiry, to obtain a service function supported by the terminal 100. Based on this, only if the terminal 100 learns that the Bluetooth device 200 supports a service function, the terminal 100 and the Bluetooth device 200 can establish a service connection based on the service function. For example, after the terminal 100 performs a service inquiry about the Bluetooth device 200 by using the SDP, and learns that the Bluetooth device 200 supports an audio data transmission function, the terminal 100 may establish an audio data transmission connection to the Bluetooth device 200.

Figure 4A:
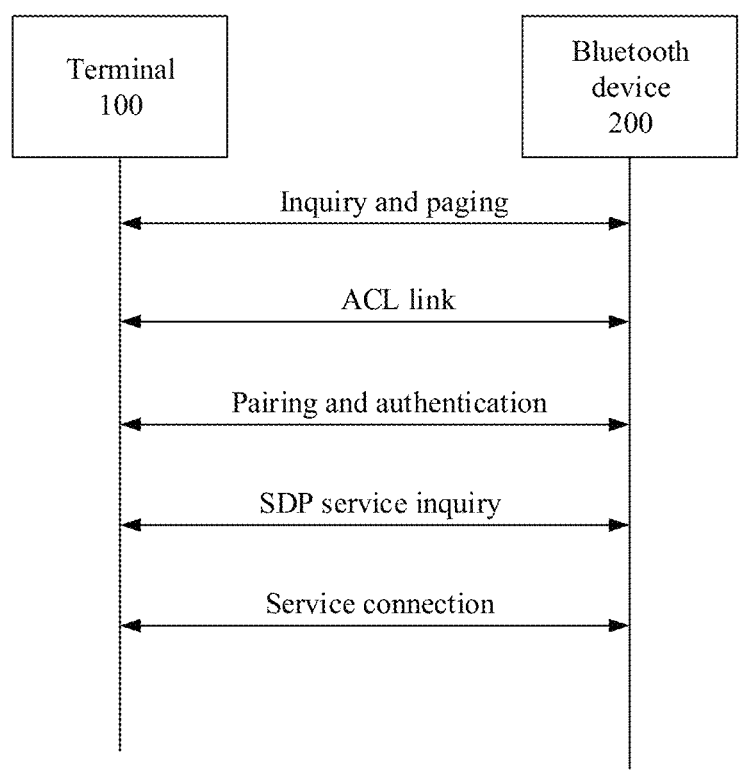
FIG. 4A is a schematic flowchart of a service inquiry in a related technology of this application.

As shown in FIG. 4A, in an existing Bluetooth standard protocol, a service connection establishment procedure may include the following operations:

1. A terminal 100 and a Bluetooth device 200 perform an inquiry and paging (paging).

After enabling a Bluetooth function, the terminal 100 may enter an inquiry state. After entering the inquiry state, the terminal 100 may select, at an interval of a period of time (for example, 312.5 μs), a new frequency to send an inquiry request. The inquiry request includes a Bluetooth address (BD_ADDR) of the terminal 100. If a nearby device of the terminal 100 is in a discoverable state, a new listening frequency may be selected at an interval of a period of time (for example, 1.28 s). The terminal 100 (inquiry device) and the nearby device (inquired device) may use a low address part (low address part, LAP) of a general inquiry access code (GIAC) as an inquiry address. After receiving the inquiry request sent by the terminal 100, the Bluetooth device 200 may send an inquiry response to the terminal 100 based on the Bluetooth address of the terminal 100 in the inquiry request.

After entering an inquiry scan state, the Bluetooth device 200 may scan for an inquiry request sent by the nearby device. After receiving the inquiry request sent by the terminal 100, the Bluetooth device 200 may return the inquiry response to the terminal 100 based on the Bluetooth address of the terminal 100 in the inquiry request. The inquiry response includes a Bluetooth address of the Bluetooth device 200.

After receiving the inquiry response returned by the Bluetooth device 200, the terminal 100 may consider that the terminal 100 has discovered the Bluetooth device 200. The terminal 100 may further obtain a device name of the Bluetooth device 200, to display the device name in an Available Devices list in a Bluetooth setting interface of the terminal 100.

The terminal 100 may receive a selection operation performed by a user on an option corresponding to the Bluetooth device 200 in the Available Devices list. In response to the selection operation, the terminal 100 may perform carrier frequency hopping based on a paging hopping sequence, and send a paging request to the Bluetooth device 200 in a sending time slot, to request the Bluetooth device 200 to join a piconet in which the terminal 100 is located. The paging hopping sequence is generated based on 28 lower bits of a Bluetooth address of a paged device. The Bluetooth device 200 may listen for the paging request of the terminal 100 at a frequency hopping frequency in a fixed time window in a fixed cycle. After obtaining, through listening, the paging request sent by the terminal 100, the Bluetooth device 200 may send a slave paging response to the terminal 100 in a next time slot. After receiving the slave paging response of the Bluetooth device 200, the terminal 100 may send a master paging response in a next time slot.

After receiving the master paging response sent by the terminal 100, the Bluetooth device 200 may enter a connected mode, automatically become a slave device of the piconet, and return a slave paging response to the terminal 100 again. After receiving the slave paging response sent by the Bluetooth device 200 again, the terminal 100 may enter a connected mode, and automatically become a master device of the piconet. In the connected mode, the two communication parties of the terminal 100 and the Bluetooth device 200 hop to a frequency channel at an interval of a period of time (for example, 625 microseconds). In the connected mode, a channel hopping sequence used by the two communication parties of the terminal 100 and the Bluetooth device 200 is generated based on the 28 least significant bits of the Bluetooth address of the terminal 100.

2. The terminal 100 and the Bluetooth device 200 establish an ACL link.

After completing paging, the terminal 100 and the Bluetooth device 200 may establish the ACL link. After the ACL link is established, a logical link control and adaptation protocol (L2CAP) signaling channel (a channel identifier CID=0x0001) between the terminal 100 and the Bluetooth device 200 already exists. The terminal 100 and the Bluetooth device 200 may transmit control signaling and some data through the L2CAP signaling channel. The terminal 100 and the Bluetooth device 200 may establish an L2CAP connection through the L2CAP signaling channel.

3. The terminal 100 and the Bluetooth device 200 perform pairing and authentication.

Pairing between the terminal 100 and the Bluetooth device 200 may be a link manager protocol (LMP) pairing, may be secure simple pairing (SSP), or may be another non-standard pairing method. After pairing between the terminal 100 and the Bluetooth device 200 is completed, a shared key: a link key may be created. The link key may be used by the terminal 100 and the Bluetooth device 200 to authenticate a device and encrypt to-be-exchanged data.

After the terminal 100 is paired with the Bluetooth device 200, the terminal 100 and the Bluetooth device 200 share a same link key. Then, the terminal 100 and the Bluetooth device 200 may perform authentication based on the link key. After completing authentication, the terminal 100 and the Bluetooth device 200 may derive an encryption key based on the link key and a random number exchanged shortly before an encryption communication exchange. Then, the terminal 100 and the Bluetooth device 200 may encrypt, based on the encryption key, data to be transmitted between the two communication parties.

4. The terminal 100 performs a service inquiry about the Bluetooth device 200 by using an SDP.

The terminal 100 may learn, by using the SDP, a service supported by the Bluetooth device 200 (for example, whether the Bluetooth device 200 supports email sending, fax printing, audio transmission, or a voice call).

Before performing the service inquiry about the Bluetooth device 200 by using the SDP, the terminal 100 needs to establish an L2CAP dynamic channel. Only after establishing the L2CAP dynamic channel, the terminal 100 can perform the service inquiry about the Bluetooth device 200 by using the SDP, to learn of a service function supported by the Bluetooth device 200. The terminal 100 needs to establish the L2CAP dynamic channel before performing the service inquiry each time by using the SDP.

Figure 4B:
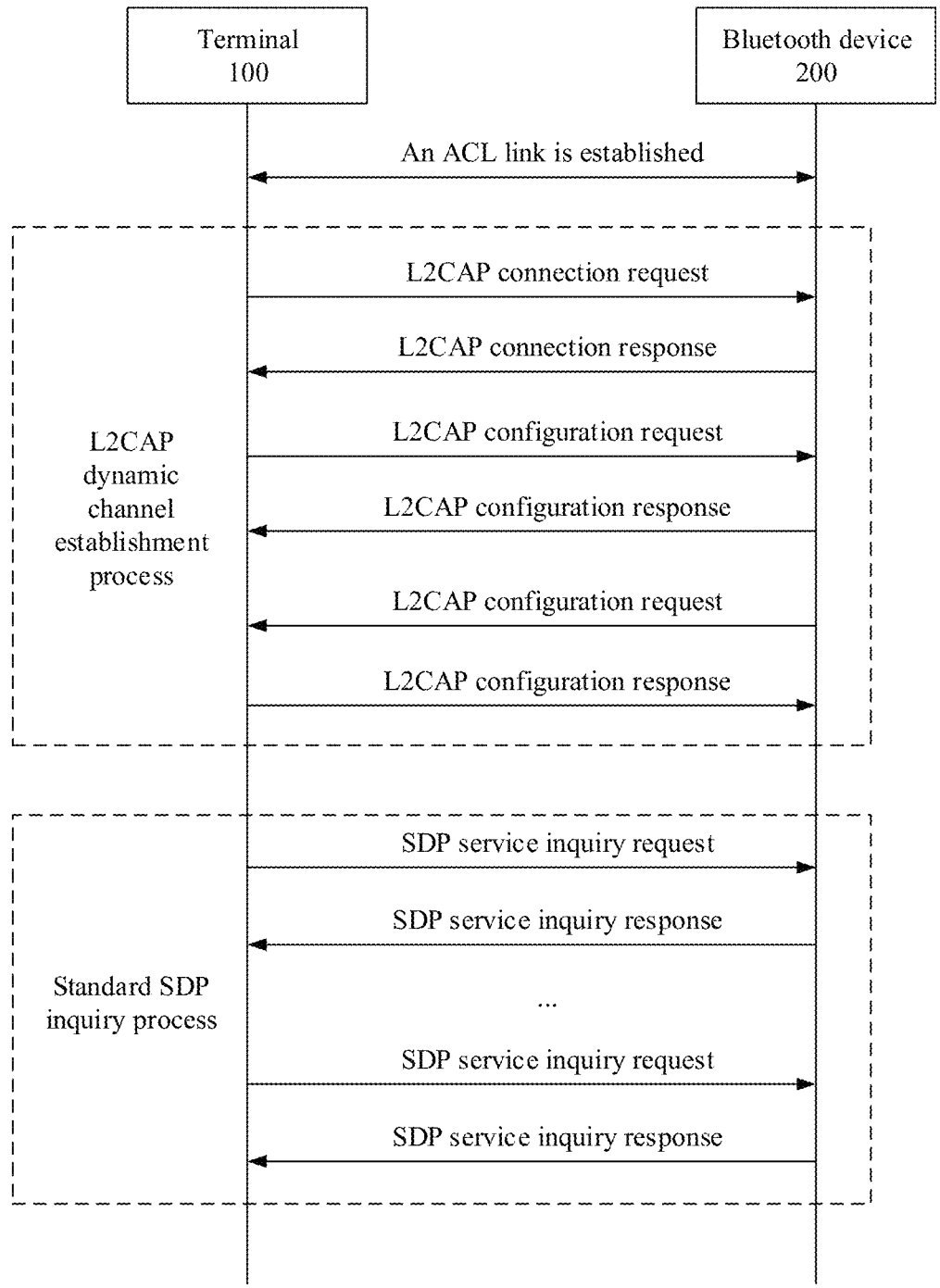
FIG. 4B is a schematic flowchart of a service inquiry in a related technology of this application.

As shown in FIG. 4B, after the terminal 100 and the Bluetooth device 200 establish the ACL link, and complete pairing and authentication, the terminal 100 may send an L2CAP connection request to the Bluetooth device 200 on the L2CAP signaling channel. After receiving the L2CAP connection request, the Bluetooth device 200 may return an L2CAP connection response to the terminal 100 on the L2CAP signaling channel. Then, after receiving the connection response returned by the Bluetooth device 200, the terminal 100 may send a configuration request to the Bluetooth device 200. After receiving the configuration request sent by the terminal 100, the Bluetooth device 200 may return a configuration response to the terminal 100. The Bluetooth device 200 may alternatively actively send a configuration request to the terminal 100. After receiving the configuration request sent by the Bluetooth device 200, the terminal 100 may return a configuration response to the Bluetooth device 200.

A requester (namely, a device that sends a configuration request) may configure the following parameters based on the configuration request: a maximum transmission unit (MTU) of receiving performed by the requester, a maximum refresh time of sending performed by the requester, sending quality of service (QoS) of the requester, and input flow control and error control information of the requester.

A responder (namely, a device that returns a configuration response) may configure the following parameters based on the configuration response: a maximum transmission unit of an output performed by the responder, a refresh timeout period of the requester, a receiving quality of service flow requirement of the responder, and flow control and error control information of the responder.

Establishment of an L2CAP dynamic channel used for an SDP service inquiry is completed between the terminal 100 and the Bluetooth device 200 through configuration interaction (the configuration request and response) between the terminal 100 and the Bluetooth device 200.

After the terminal 100 and the Bluetooth device 200 complete establishment of the L2CAP dynamic channel used for the SDP service inquiry, the terminal 100 may send an SDP service inquiry request to the Bluetooth device 200 based on the established L2CAP dynamic channel, to request to obtain the service function supported by the Bluetooth device 200. After receiving the SDP service inquiry request sent by the terminal 100, the Bluetooth device 200 may return an SDP service inquiry response to the terminal 100 based on the established L2CAP dynamic channel. The SDP service inquiry response includes information about the service function supported by the Bluetooth device 200.

After the terminal 100 and the Bluetooth device 200 complete the SDP service inquiry, the L2CAP dynamic channel established for the SDP service inquiry needs to be released. For example, the terminal 100 may actively release the L2CAP dynamic channel with the Bluetooth device 200.

5. The terminal 100 and the Bluetooth device 200 establish the service connection.

For example, when the terminal 100 finds, through the SDP service inquiry, that the Bluetooth device 200 can support an audio transmission function. Then, the terminal 100 may initiate an RFCOMM connection request to the Bluetooth device, and establish an RFCOMM connection to the Bluetooth device. Then, the terminal 100 and the Bluetooth device may establish a connection for the audio transmission function, to perform audio transmission.

It can be learned from the foregoing related technology that, before performing the SDP service inquiry, the terminal 100 first needs to establish the L2CAP dynamic channel, and after completing the SDP service inquiry, the terminal 100 releases the established L2CAP dynamic channel. Consequently, an entire Bluetooth service connection process consumes a too long period of time.

Therefore, this application provides a Bluetooth connection method, so that when the ACL link is established, an information exchange such as the SDP service inquiry and capability negotiation is completed by using two signaling types: an echo request and an echo response on the L2CAP signaling channel, to omit a process such as establishing the L2CAP dynamic channel used for the SDP service inquiry, and reduce a period of time for establishing a Bluetooth service connection.

The following describes a Bluetooth connection method provided in this application.

In some application scenarios, after the ACL link between the terminal 100 and the Bluetooth device 200 succeeds, the L2CAP signaling channel already exists. Signaling commands on the L2CAP signaling channel include an echo request command and an echo response command. The SDP service inquiry is completed based on the echo request command and the echo response command, to omit the process of establishing the L2CAP dynamic channel used for the SDP service inquiry, and reduce a period of time for establishing a service connection.

Figure 5:
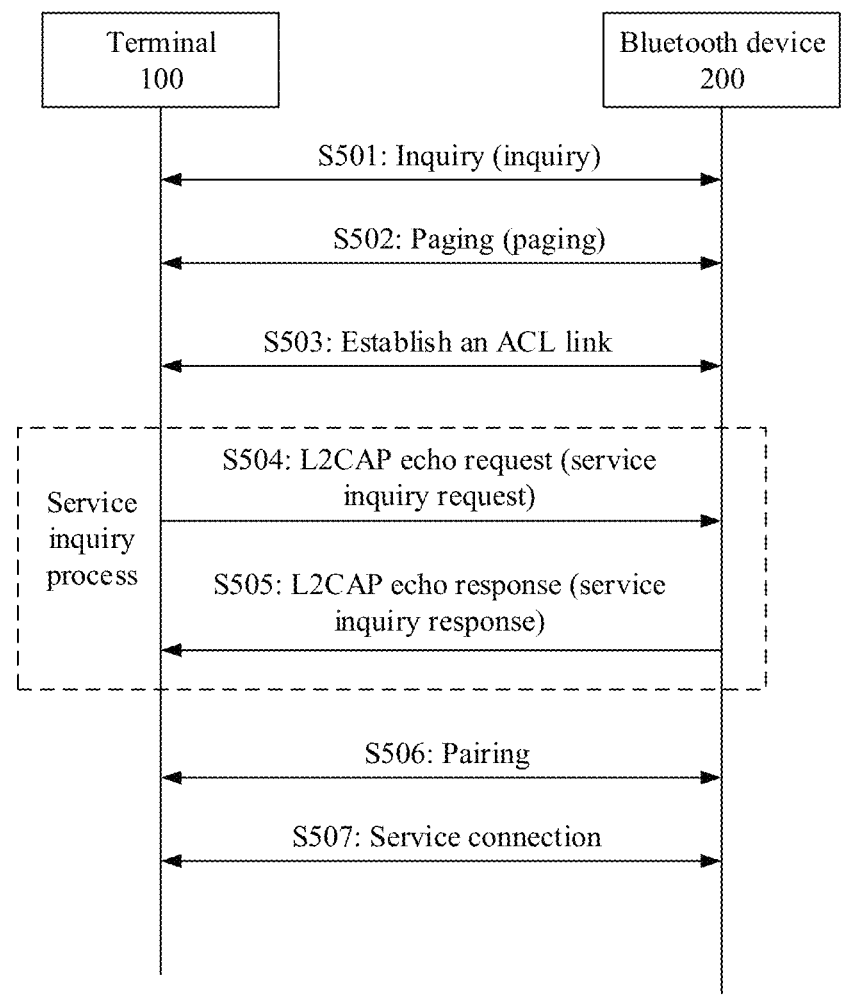
FIG. 5 is a schematic flowchart of a Bluetooth connection method according to an embodiment of this application.

FIG. 5 shows a Bluetooth connection method according to an embodiment of this application. As shown in FIG. 5, the method includes the following operations.

S501: A terminal 100 and a Bluetooth device 200 perform inquiry.

First, the terminal 100 may receive an input operation performed by a user, and enable a Bluetooth function.

Figure 6A:
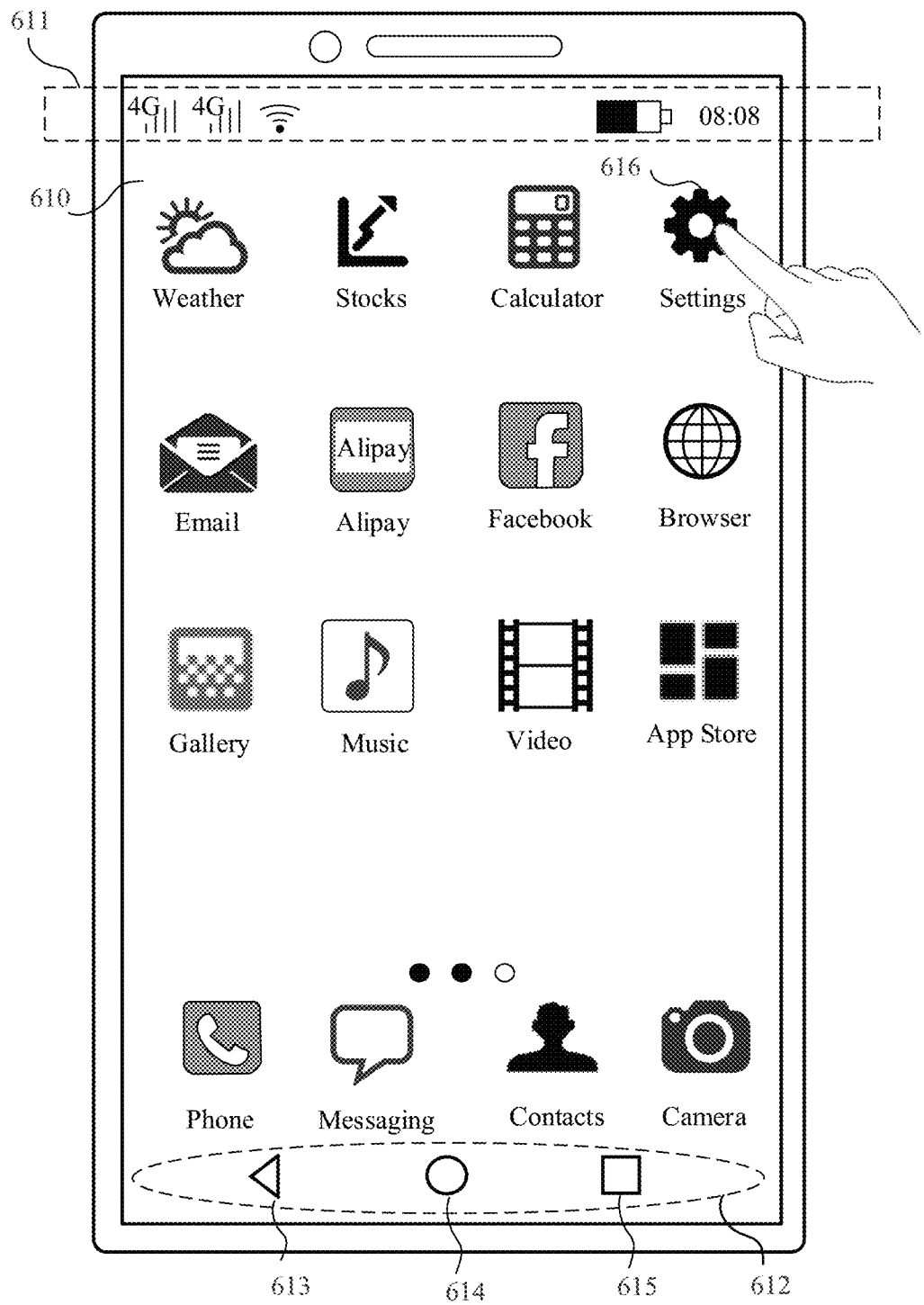
FIG. 6A to FIG. 6G are schematic diagrams of a group of interfaces according to an embodiment of this application.

For example, as shown in FIG. 6A, the terminal 100 displays an interface 610 of a home screen. The interface 610 displays a page on which an application icon is placed, and the page includes a plurality of application icons (for example, a Weather application icon, a Stocks application icon, a Calculator application icon, a Settings application icon 616, an Email application icon, an Alipay application icon, a Facebook application icon, a Browser application icon, a Gallery application icon, a Music application icon, a Video application icon, and an App Store icon). A page indicator is further displayed below the plurality of application icons, to indicate a location relationship between the currently displayed page and another page. A plurality of tray icons (for example, a Phone application icon, a Messages application icon, a Contacts application icon, and a Camera application icon) are below the page indicator. The tray icons remain displayed when the page is switched. The page may alternatively include a plurality of application icons and a page indicator. Alternatively, the page indicator may not be a part of the page and may exist independently, and the tray icon is also optional. This is not limited in an embodiment of the application. A status bar 611 is displayed at the top of the interface 610, and the status bar 611 may include one or more signal strength indicators of a mobile communications signal (also referred to as a cellular signal), one or more signal strength indicators of a wireless fidelity (Wi-Fi) signal, a battery status indicator, a time indicator, and the like. A navigation bar 612 is displayed below the tray icon. The navigation bar 612 may include system navigation buttons such as a back button 613, a home screen button 614, and a call-out task history button 615. When detecting that the user taps the back button 613, the terminal 100 may display a previous page of a current page. When detecting that the user taps the home screen button 614, the terminal 100 may display the home screen. When detecting that the user taps the call-out task history button 615, the terminal 100 may display a task that is recently opened by the user. Names of the navigation buttons may alternatively be other names. This is not limited in this application. Not limited to a virtual button, each navigation button in the navigation bar 612 may be alternatively implemented as a physical button.

The terminal 100 may receive an input operation (for example, a single tap) performed by the user on the Settings icon 616. In response to the input operation performed on the Settings icon 616, the terminal 100 may display a Settings interface 620 shown in FIG. 6B.

Figure 6B:
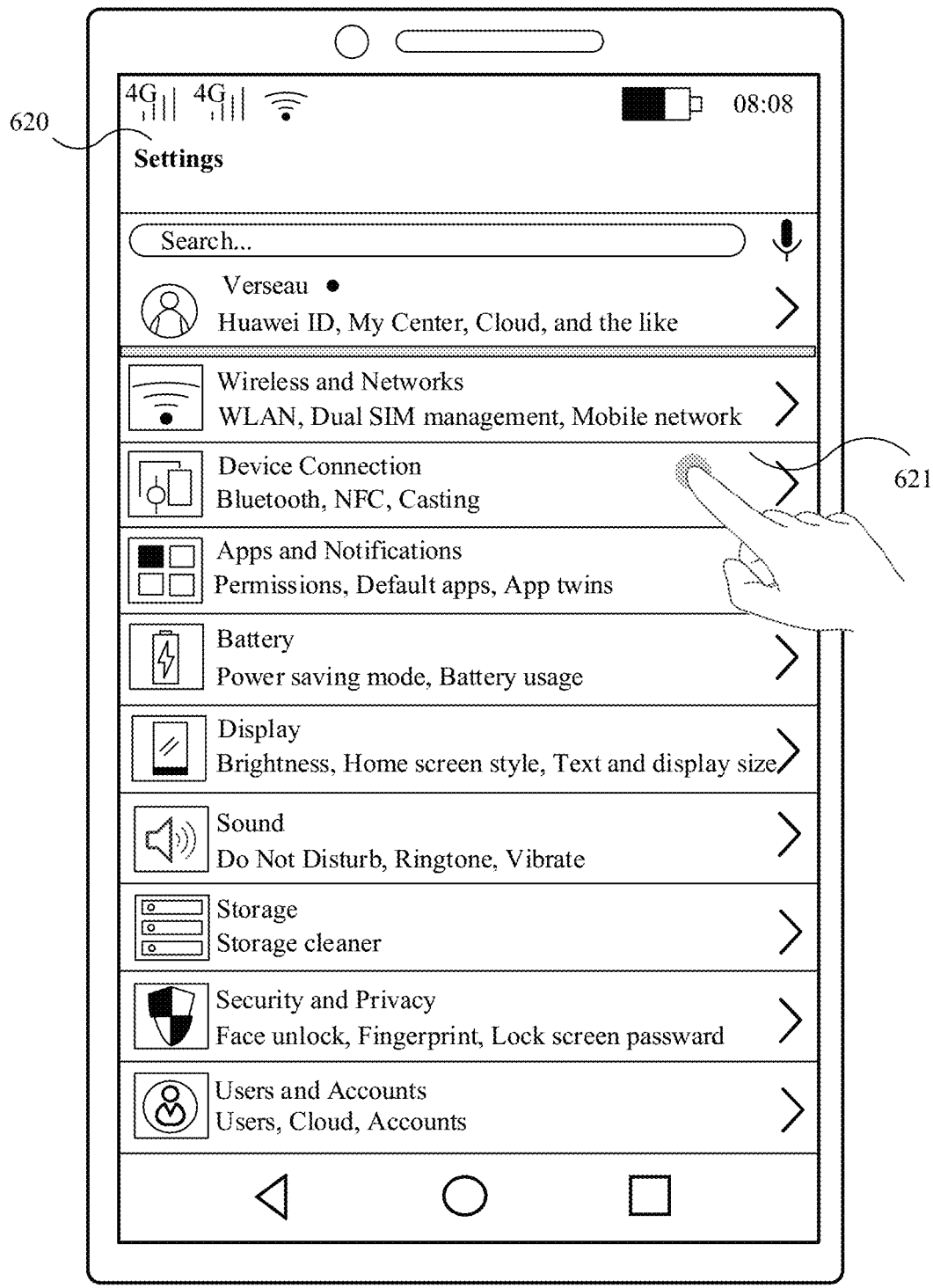

As shown in FIG. 6B, the Settings interface 620 displays a Wi-Fi and Network setting entry, a Device Connection setting entry 621, an Applications and Notifications setting entry, a Battery setting entry, a Display setting entry, a Sounds setting entry, a Storage setting entry, a Security and Privacy setting entry, a Users and Accounts setting entry, and the like.

The terminal 100 may receive an input operation (for example, a single tap) performed by the user on the Device Connection entry 621. In response to the input operation performed on the Device Connection entry 621, the terminal 100 may display a Device Connection interface 630 shown in FIG. 6C.

Figure 6C:
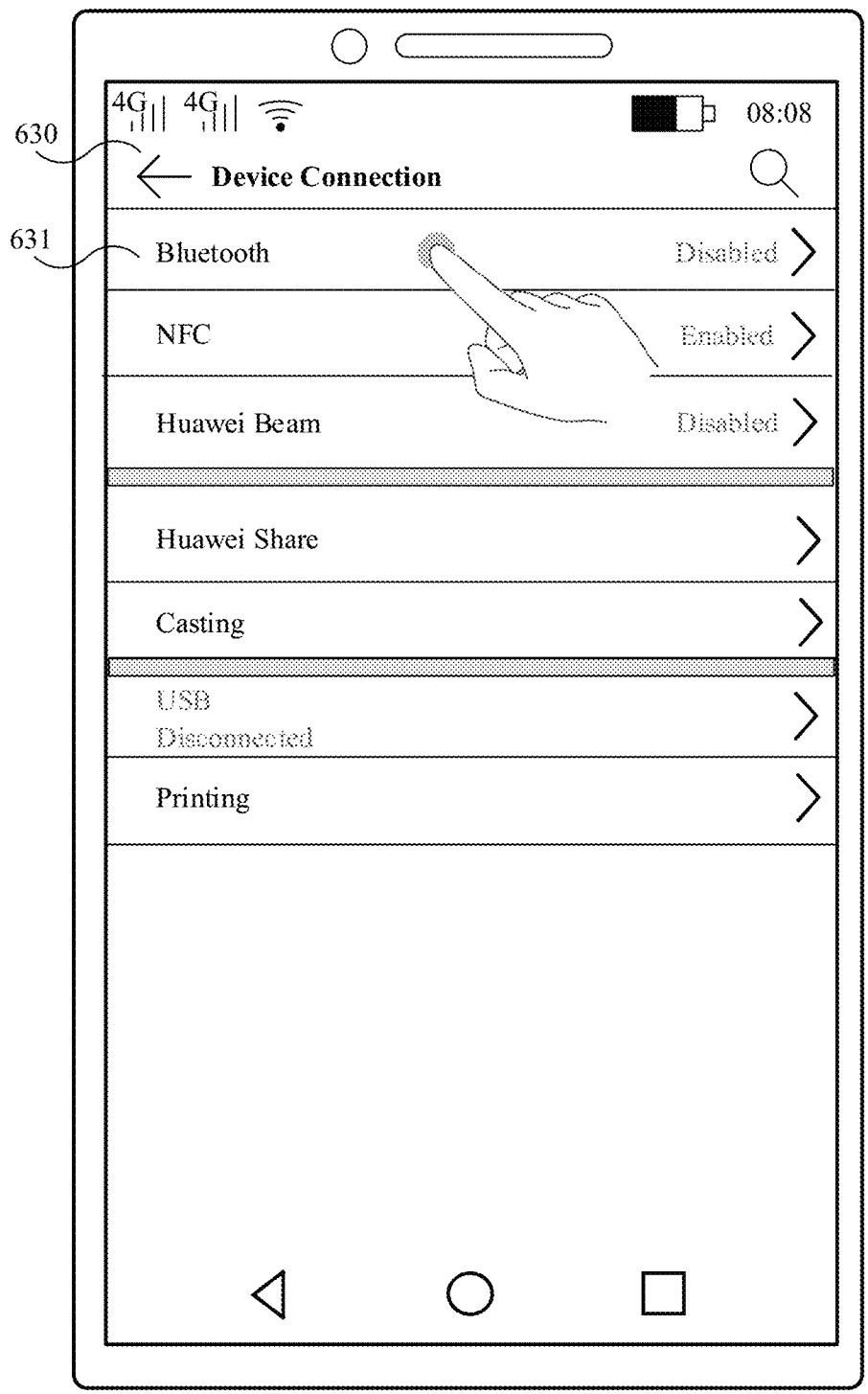

As shown in FIG. 6C, the Device Connection interface 630 displays a Bluetooth setting entry 631, an NFC setting entry, a Huawei Beam setting entry, a Huawei Share setting entry, a Casting setting entry, a USB setting entry, a Printing setting entry, and the like.

The terminal 100 may receive an input operation performed by the user on the Bluetooth setting entry 631 in the Device Connection interface 630. In response to the input operation performed on the Bluetooth setting entry 631, the terminal 100 may display a Bluetooth setting interface 640 shown in FIG. 6D.

Figure 6D:
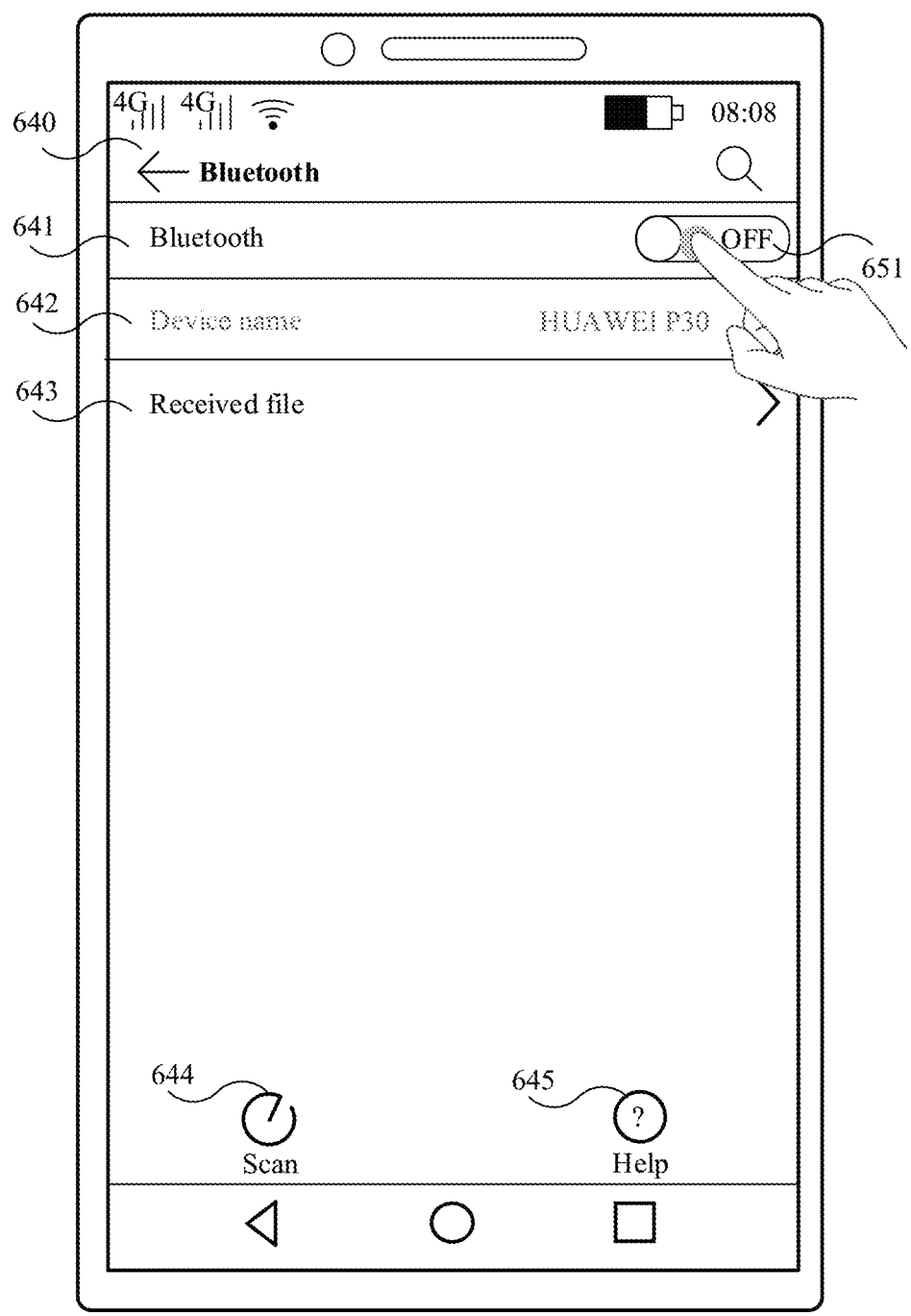

As shown in FIG. 6D, the Bluetooth setting interface 640 displays a Bluetooth switch entry 641, a Device name setting entry 642, a Received file setting entry 643, a Scan control 644, and a Help control 645. The Bluetooth switch entry 641 displays a Bluetooth switch 651. The Bluetooth switch 651 may be configured to: receive an operation performed by the user, and trigger the terminal 100 to enable/disable the Bluetooth function.

For example, the Bluetooth switch 651 is in a disabled state currently, and the terminal 100 may receive an input operation (for example, a tap) performed by the user on the Bluetooth switch 651. In response to the input operation performed on the Bluetooth switch 651, the terminal 100 may enable the Bluetooth function.

After the terminal 100 enables the Bluetooth function, the terminal 100 may select, at an interval of a period of time (for example, 312.5 μs), a new frequency to send an inquiry request. The inquiry request includes a Bluetooth address (BD_ADDR) of the terminal 100. If a nearby device of the terminal 100 is in a discoverable state, a new listening frequency may be selected at an interval of a period of time (for example, 1.28 s). The terminal 100 (inquiry device) and the nearby device (inquired device) may use a low address part (LAP) of a general inquiry access code (GIAC) as an inquiry address. After the inquiry request sent by the terminal 100 is received, an inquiry response may be sent to the terminal 100 based on the Bluetooth address of the terminal 100 in the inquiry request.

After receiving the inquiry request sent by the terminal 100, the Bluetooth device 200 may return an inquiry response to the terminal 100 based on the Bluetooth address of the terminal 100 in the inquiry request. The inquiry response includes a Bluetooth address of the Bluetooth device 200.

After receiving the inquiry response returned by the Bluetooth device 200, the terminal 100 may consider that the terminal 100 has discovered the Bluetooth device 200. The terminal 100 may further obtain a device name of the Bluetooth device 200, to display the device name in an Available Devices list in the Bluetooth setting interface of the terminal 100.

Figure 6E:
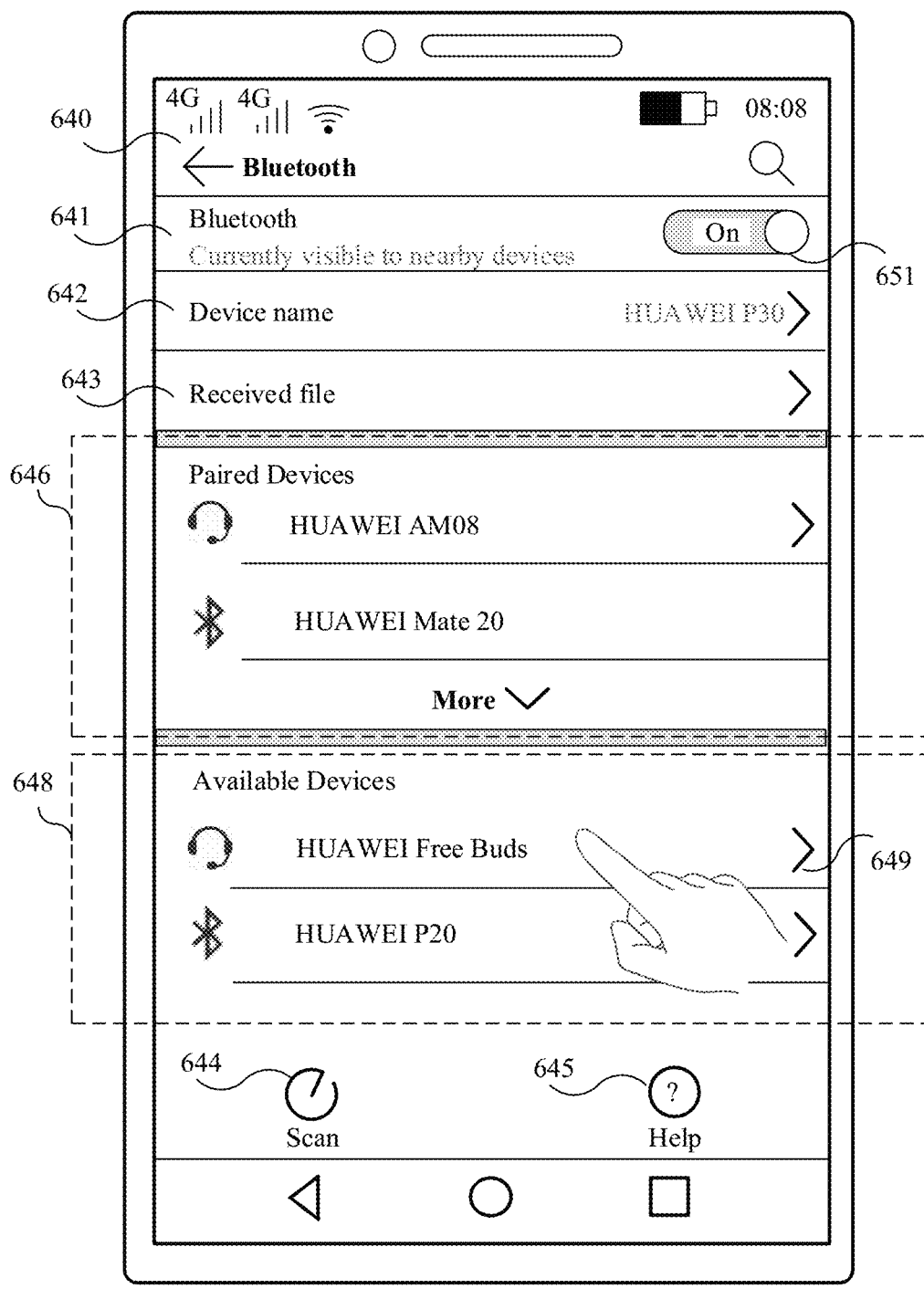

For example, as shown in FIG. 6E, after enabling the Bluetooth function, the terminal 100 may display a Paired Devices list 646 and an Available Devices list 648. One or more Paired Devices options (for example, a device option "HUAWEI AM08" and a device option "HUAWEI Mate 20") may be displayed in the paired list. After discovering the Bluetooth device 200 and obtaining the device name of the Bluetooth device 200, the terminal 100 may display a device option 649 corresponding to the Bluetooth device 200 in the Available Devices list 648. The device name of the Bluetooth device 200 is displayed on the device option 649 (for example, the device name of the Bluetooth device 200 may be "HUAWEI Free Buds").

S502: The terminal 100 and the Bluetooth device 200 perform paging.

As shown in FIG. 6E, the terminal 100 may receive a selection operation (for example, a tap) performed by the user on the device option 649 corresponding to the Bluetooth device 200 in the Available Devices list 648. In response to the selection operation, the terminal 100 may perform carrier frequency hopping based on a paging hopping sequence, and send a paging request (page request) to the Bluetooth device 200 in a sending time slot, to request the Bluetooth device 200 to join a piconet in which the terminal 100 is located. The paging hopping sequence (paging hopping sequence) is generated based on 28 lower bits of a Bluetooth address of a paged device. The Bluetooth device 200 may listen for the paging request of the terminal 100 at a frequency hopping frequency in a fixed time window in a fixed cycle. After obtaining, through listening, the paging request sent by the terminal 100, the Bluetooth device 200 may send a slave paging response to the terminal 100 in a next time slot. After receiving the slave paging response of the Bluetooth device 200, the terminal 100 may send a master paging response in a next time slot.

After receiving the master paging response sent by the terminal 100, the Bluetooth device 200 may enter a connected mode, automatically become a slave device of the piconet, and return a slave paging response to the terminal 100 again. After receiving the slave paging response sent by the Bluetooth device 200 again, the terminal 100 may enter a connected mode, and automatically become a master device of the piconet. In the connected mode, the terminal 100 and the Bluetooth device 200 hop to a frequency channel at an interval of a period of time (for example, 625 microseconds). In the connected mode, a channel hopping sequence used by the terminal 100 and the Bluetooth device 200 is generated based on the 28 least significant bits of the Bluetooth address of the terminal 100.

S503: The terminal 100 and the Bluetooth device 200 establish an ACL link.

After completing paging, the terminal 100 and the Bluetooth device 200 may establish the ACL link. After the ACL link is established, a logical link control and adaptation protocol (L2CAP) signaling channel (a channel identifier CID=0x0001) between the terminal 100 and the Bluetooth device 200 already exists. The terminal 100 and the Bluetooth device 200 may transmit control signaling and some data through the L2CAP signaling channel. The terminal 100 and the Bluetooth device 200 may establish an L2CAP connection through the L2CAP signaling channel.

S504: The terminal 100 sends a first echo request to the Bluetooth device 200 through the L2CAP signaling channel. The first echo request carries service information of the terminal 100. The first echo request is used to notify the Bluetooth device 200 of the service information of the terminal 100, and to request the Bluetooth device 200 to return service information of the Bluetooth device 200 to the terminal 100.

Figure 7A:
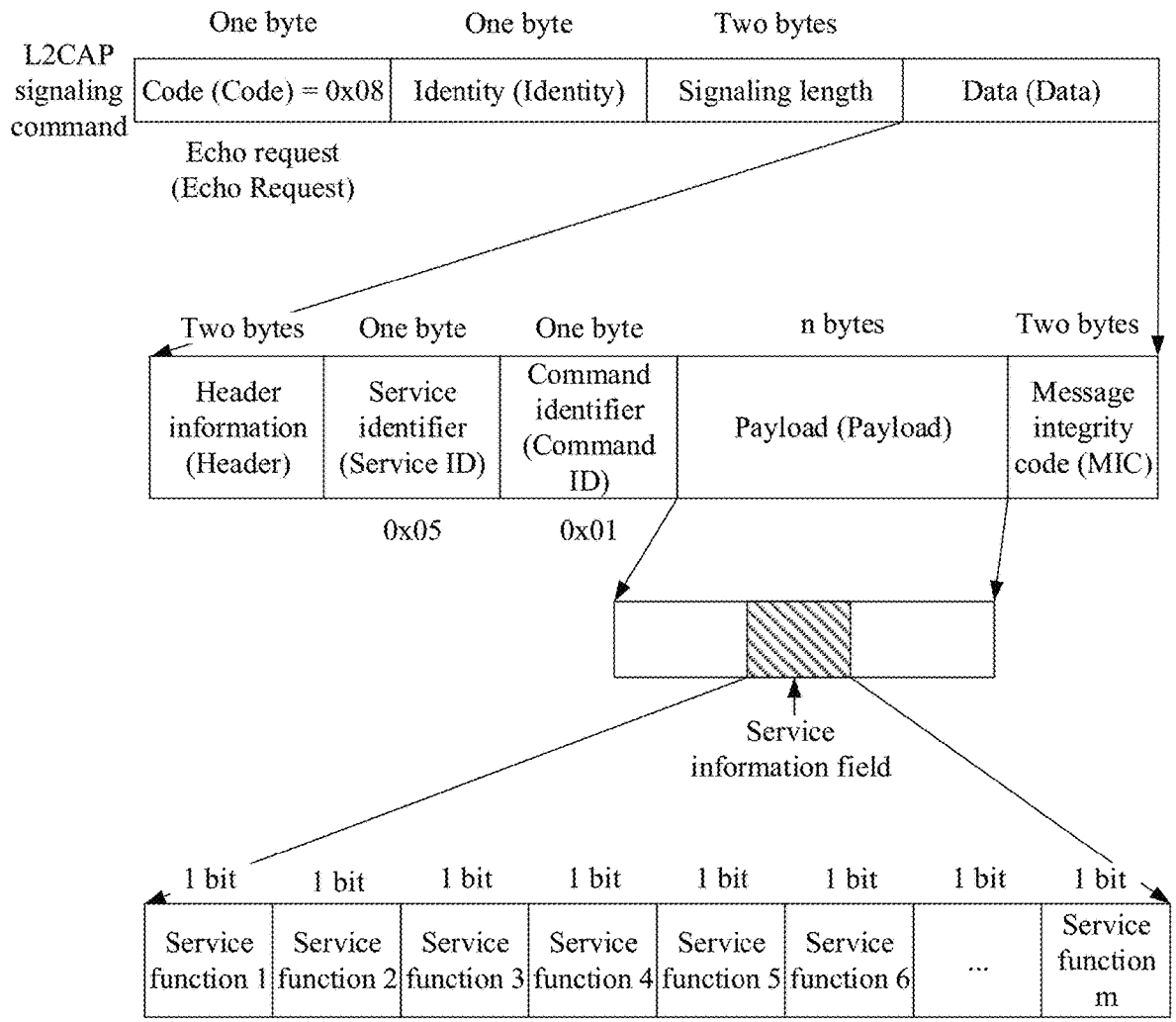
FIG. 7A is a schematic diagram of a signaling format of an echo request according to an embodiment of this application.

For a signaling format of the first echo request, refer to FIG. 7A. As shown in FIG. 7A, the first echo request may include a code (field, an identity field, a signaling length field, and a data field.

1. The code field is used to identify a command type of L2CAP signaling. The command type of L2CAP signaling includes a reserved type, a command reject type, a connection request type, a connection response type, a configuration request type, a configuration response type, a disconnection request type, a disconnection response type, an echo request type, an echo response type, an information request type, an information response type, and the like. A correspondence between a code and a command type of L2CAP signaling may be shown in Table 1.

TABLE 1

| Code (Code) | Command type |
|---|---|
| 0x00 | Reserved (reserved) |
| 0x01 | Command reject (command reject) |
| 0x02 | Connection request (connection request) |
| 0x03 | Connection response (connection response) |
| 0x04 | Configuration request (configure request) |
| 0x05 | Configuration response (configure response) |
| 0x06 | Disconnection request (disconnection request) |
| 0x07 | Disconnection response (disconnection response) |
| 0x08 | Echo request (echo request) |
| 0x09 | Echo response (echo response) |
| 0x0A | Information request (information request) |
| 0x0B | Information response (information response) |
| . . . | . . . |

It can be learned from Table 1 that when Code=0x00, the L2CAP signaling is reserved. When Code=0x01, a corresponding command type is the command reject type. When Code=0x02, a corresponding command type is a connection request type. When Code=0x03, a corresponding command type is a connection response type. When Code=0x04, a corresponding command type is a configuration request type. When Code=0x05, a corresponding command type is a configuration response type. When Code=0x06, a corresponding command type is a disconnection request type. When Code=0x07, a corresponding command type is a disconnection response (type. When Code=0x08, a corresponding command type is an echo request type. When Code=0x09, a corresponding command type is an echo response type. When Code=0x0A, a corresponding command type is an information request type. When Code=0x0B, a corresponding command type is an information response type, or the like.

Therefore, in an embodiment of the application, a value of a code field of an echo request is "0x08". A value of a code field of an echo response is "0x09".

2. The identifier field occupies one byte, and is used to match a request and a response. A device (for example, the terminal 100) of a requester sets this field, and a device (for example, the Bluetooth device 200) of a responder uses a same value in the response. Different identifiers need to be used for each initial command. For any two devices, different values are used for each successful command. If all other values have been used after a first command is transmitted, the same values can be cycled.

3. The signaling length field occupies two bytes, and is only used to indicate a size of a command data field in bytes. To be specific, the side of the data field does not include the code, the identifier, and the signaling length field.

4. The data field occupies any quantity of bytes. A length of the data field is variable. The length of the data field may be obtained based on the signaling length field. The code field determines a format of the data field. A data field of the first echo request includes a service instruction type of the echo request and the service information of the terminal 100. The service instruction type identifies that the first echo request is used for a service inquiry. The service information of the terminal 100 includes a service function supported by the terminal 100.

For example, as shown in FIG. 7A, the data field of the first echo request includes a header information (Header) field, a service identifier (Service ID) field, a command identifier (Command ID) field, a payload field, and a message integrity code (message integrity code, MIC) field. The message integrity code field is used by the Bluetooth device 200 to verify data integrity of the data field of the first echo request after receiving the first echo request.

The header information field may include an identifier used as data of an L2CAP echo message, version information of the L2CAP echo message, and the like, and the header information field may occupy one byte. The service identifier field may occupy one byte. The command identifier field may occupy one byte. The service identifier field and the command identifier field determine the service instruction type of the first echo request. For example, when a value of the service identifier field is "0x05" and a value of the command identifier field is "0x01", it may indicate that the service instruction type of the first echo request is "SDP service inquiry request". The payload field includes a service information field, and the service information field includes the service function supported by the terminal 100.

For example, the service information field includes a bit corresponding to a plurality of service functions. When a bit corresponding to a service function is 0, it indicates that the terminal 100 does not support the service function. When a bit corresponding to a service function is 1, it indicates that the terminal 100 supports the service function. The service function may include a Bluetooth stereo audio distribution profile (A2DP), an audio/video remote control profile (AVRCP), a hands-free profile (HFP), a headset profile (headset profile, HSP), a serial port profile (SPP), a data transmission service (DTS), and the like.

S505: The Bluetooth device 200 returns a first echo response to the terminal 100. The first echo response carries service information. The service information includes a service function supported by the Bluetooth device 200.

Figure 7B:
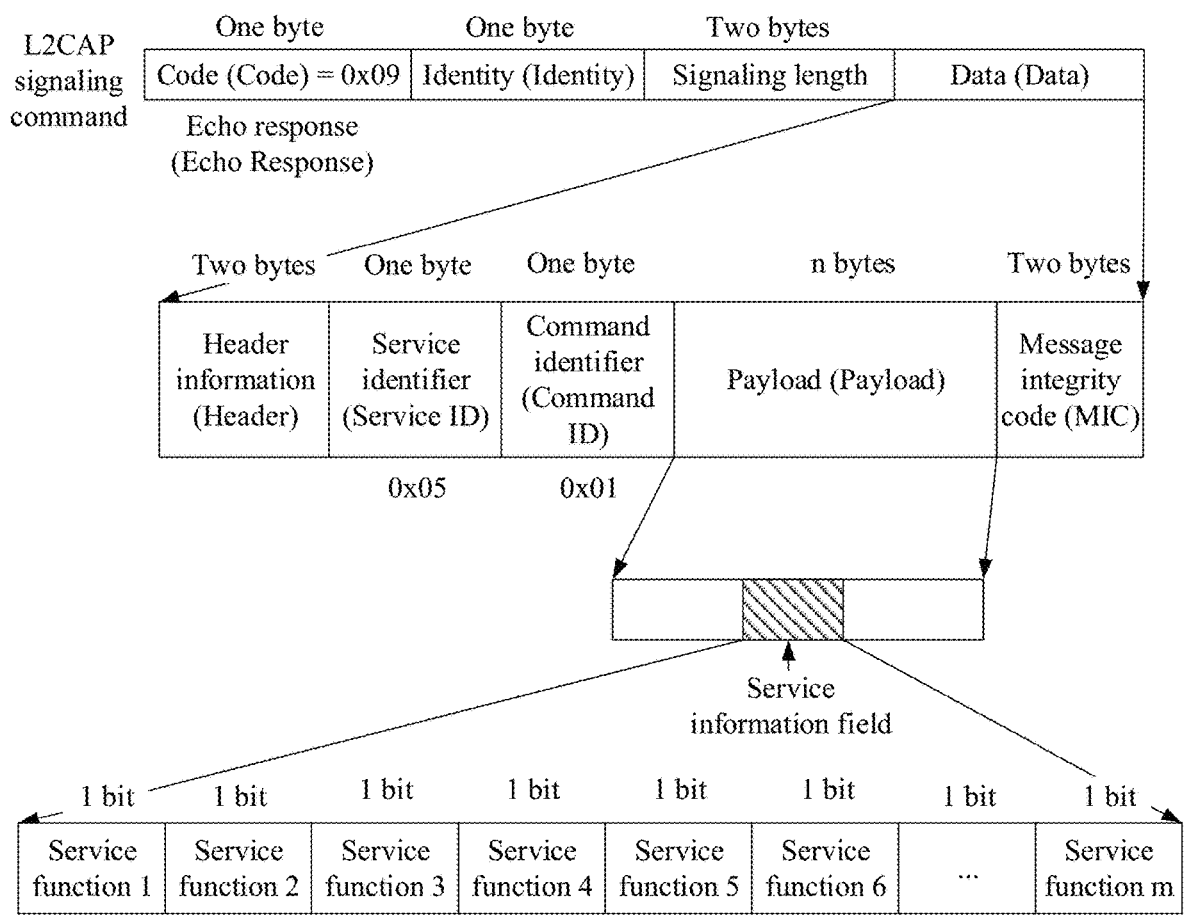
FIG. 7B is a schematic diagram of a signaling format of an echo response according to an embodiment of this application.

As shown in FIG. 7B, a signaling format of the first echo response is the same as a signaling format of the first echo request in FIG. 7A. The first echo response includes a code field, an identity field, a signaling length field, and a data field.

A value of the code field of the first echo response is "0x09", and it indicates that the first echo response is echo response signaling in L2CAP signaling. The data field of the first echo response includes a service instruction type of the echo response and the service information of the Bluetooth device 200. The service instruction type identifies that the first echo response is used for a service inquiry. The service information of the Bluetooth device 200 includes the service function supported by the Bluetooth device 200.

For example, as shown in FIG. 7B, the data field of the first echo response includes a header information (Header) field, a service identifier (Service ID) field, a command identifier (Command ID) field, a payload field, and a message integrity code (MIC) field. The message integrity code field is used by the terminal 100 to verify data integrity of the data field of the first echo response after receiving the first echo response.

The header information field may include an identifier used as data of an L2CAP echo (echo) message, version information of the L2CAP echo message, and the like, and the header information field may occupy one byte. The service identifier field may occupy one byte. The command identifier field may occupy one byte. The service identifier field and the command identifier field determine the service instruction type of the first echo response. For example, when a value of the service identifier field is "0x05" and a value of the command identifier field is "0x01", it may indicate that the service instruction type of the first echo response is "SDP service inquiry request". The payload field includes a service information field, and the service information field includes the service function supported by the Bluetooth device 200.

For example, the service information field includes a bit corresponding to a plurality of service functions. When a bit corresponding to a service function is 0, it indicates that the terminal 100 does not support the service function. When a bit corresponding to a service function is 1, it indicates that the terminal 100 supports the service function. The service function may include a Bluetooth stereo audio distribution profile (A2DP), an audio/video remote control profile (AVRCP), a hands-free profile (HFP), a headset profile (HSP), a serial port profile (SPP), a data transmission service (DTS), and the like.

After the terminal 100 obtains, from the first echo response returned by the Bluetooth device 200, the service function supported by the Bluetooth device 200, the terminal 100 may output function notification information, to notify the user of some service functions supported by the Bluetooth device 200.

Figure 6F:
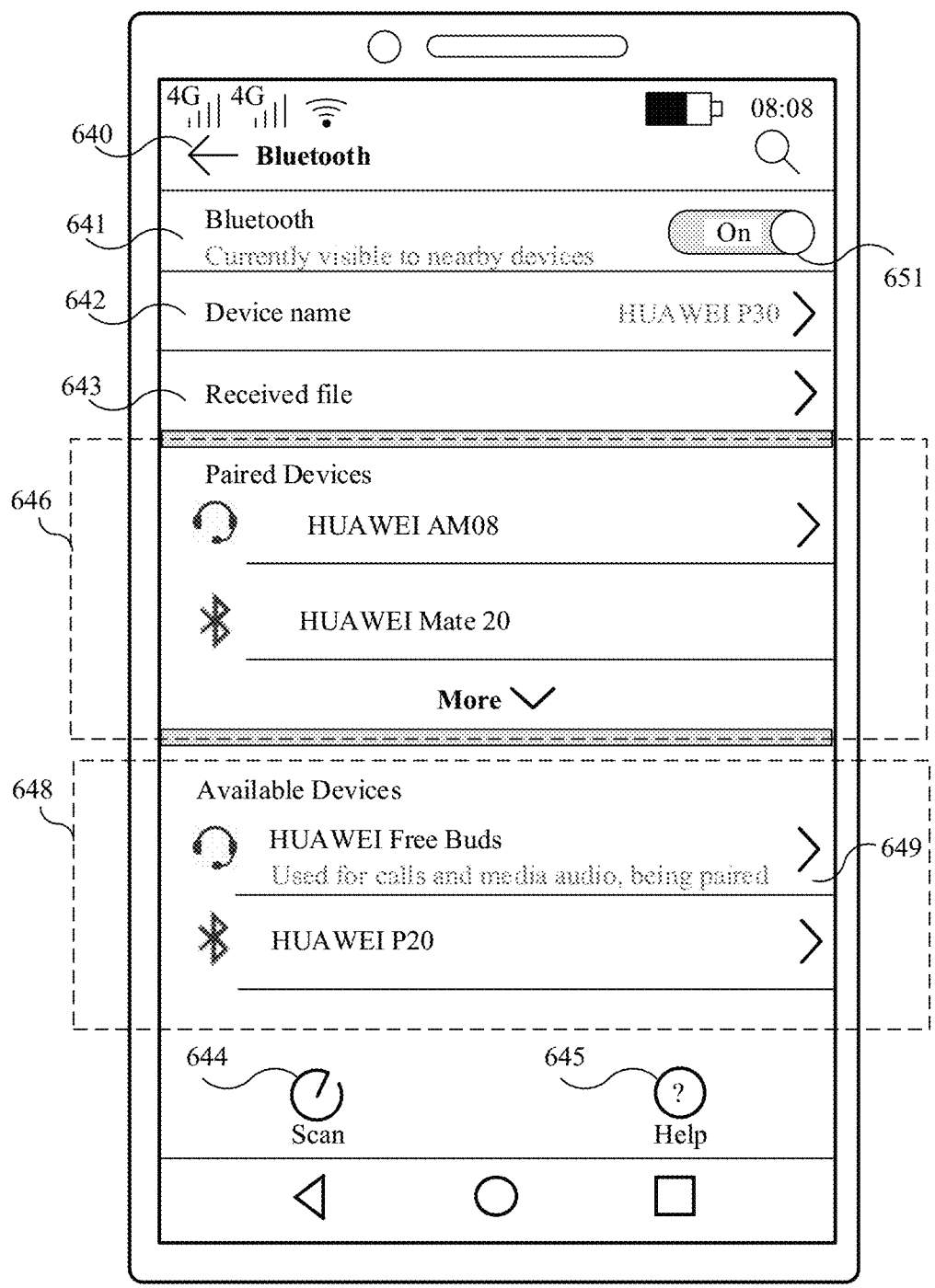

For example, as shown in FIG. 6F, after the terminal 100 obtains, from the first echo response returned by the Bluetooth device 200, the service function supported by the Bluetooth device 200, the terminal 100 may display the function notification information on the device option corresponding to the Bluetooth device 200. For example, a function notification may be text message such as "Used for calls and media audio". The foregoing example is merely used to explain this application and shall not be construed as a limitation. The function notification can alternatively be displayed after pairing is completed.

S506: The terminal 100 and the Bluetooth device 200 perform pairing.

Pairing between the terminal 100 and the Bluetooth device 200 may be a link manager protocol (LMP) pairing, may be secure simple pairing (SSP), or may be another non-standard pairing method. After pairing between the terminal 100 and the Bluetooth device 200 is completed, a shared key: a link key may be created. The link key may be used by the terminal 100 and the Bluetooth device 200 to authenticate a device and encrypt to-be-exchanged data.

After the terminal 100 is paired with the Bluetooth device 200, the terminal 100 and the Bluetooth device 200 share a same link key. Then, the terminal 100 and the Bluetooth device 200 may perform authentication based on the link key. After completing authentication, the terminal 100 and the Bluetooth device 200 may derive an encryption key based on the link key and a random number exchanged shortly before an encryption communication exchange. Then, the terminal 100 and the Bluetooth device 200 may encrypt, based on the encryption key, data to be transmitted between the two communication parties.

The following describes an LMP pairing procedure in an embodiment of the application.

1. Generate an initial key kinit.

A length of the initial key is 128 bits (bit), and is generated based on an algorithm E22.

An input (a plaintext) of the algorithm E22 includes the following three parts: a physical address BD_ADDR of a peer device, a PIN code, a length of the PIN code, and a 128-bit random number IN_RAND.

Before the initial key is generated based on a physical address of the slave device, the master device obtains the address (BD_ADDRB) of the slave device in an inquiry manner. An address of the master device is BD_ADDRA.

The PIN code is preset by the two devices (the master device and the slave device), for example, is "0000" or "1234".

The random number IN_RAND is generated by the master device and transmitted to the slave device by using a plaintext.

Because the master device and the slave device use a same algorithm E22, if values of the foregoing three parts of the two devices are equal, the initial keys calculated by the two devices also needs to be the same.

2. Generate the link key Kab.

After generating the initial key, the master device may generate a 128-bit random number Link_RandA, and the slave device may also generate a 128-bit random number Link_RandB. The master device performs a bit logical exclusive OR operation on the initial key and Link_RandA, and sends an exclusive OR result to the slave device. Similarly, the slave device performs a bit logical exclusive OR operation on the initial key and Link_RandB, and sends an exclusive OR result to the master device.

The master device may perform an operation based on the exclusive OR result sent by the slave device and a locally stored initial key, to obtain Link_RandB. The slave device may perform an operation based on the exclusive OR result sent by the master device and a locally stored initial key, to obtain Link_RandA. Therefore, the master device and the slave device have a same initial key, Link_RandA, and Link_RandB.

The master device may perform an encryption operation on Link_RandA and BD_ADDRA based on an algorithm (for example, an algorithm E21), to obtain Link_KA, and perform an encryption operation on Link_RandB and BD_ADDRB, to obtain Link_KB. Then, the master device may perform an exclusive OR operation based on Link_KA and Link_KB, to obtain Kab.

Similarly, the slave device may perform an encryption operation on Link_RandA and BD_ADDRA based on an algorithm (for example, the algorithm E21), to obtain Link_KA, and perform an encryption operation on Link_RandB and BD_ADDRB, to obtain Link_KB. Then, the slave device may perform an exclusive OR operation based on Link_KA and Link_KB, to obtain Kab.

3. The master device and the slave device perform two-way authentication.

In a two-way authentication challenge-response manner, the master device may be the responder, and the slave device may be the requester. The responder may generate a 128-bit random number AU_RANDA, and send the 128-bit random number AU_RANDA to the requester by using a plaintext. Both the responder and the requester perform an encryption operation on respectively obtained AU_RANDA, Kab, and BD_RANDB based on an algorithm E1, to respectively generate 32-bit SRESA and SRESB. SRESA is generated by the master device that serves as the responder, and SRESB is generated by the slave device that serves as the requester. The requester sends SRESB to the responder. The responder compares SRESA and SRESB. If SRESA and SRESB are equal, current authentication succeeds; or if SRESA and SRESB are unequal, authentication fails. After completing current authentication, roles of the master device and the slave device are changed. The master device serves as the requester, and the slave device serves as the responder. The master device and the slave device perform authentication in a same manner.

The terminal 100 and the Bluetooth device 200 may derive the encryption key based on the link key Kab and the random number exchanged shortly before the encryption communication exchange. Then, the terminal 100 and the Bluetooth device 200 may encrypt, based on the encryption key, data to be transmitted between the two communication parties.

Figure 6G:
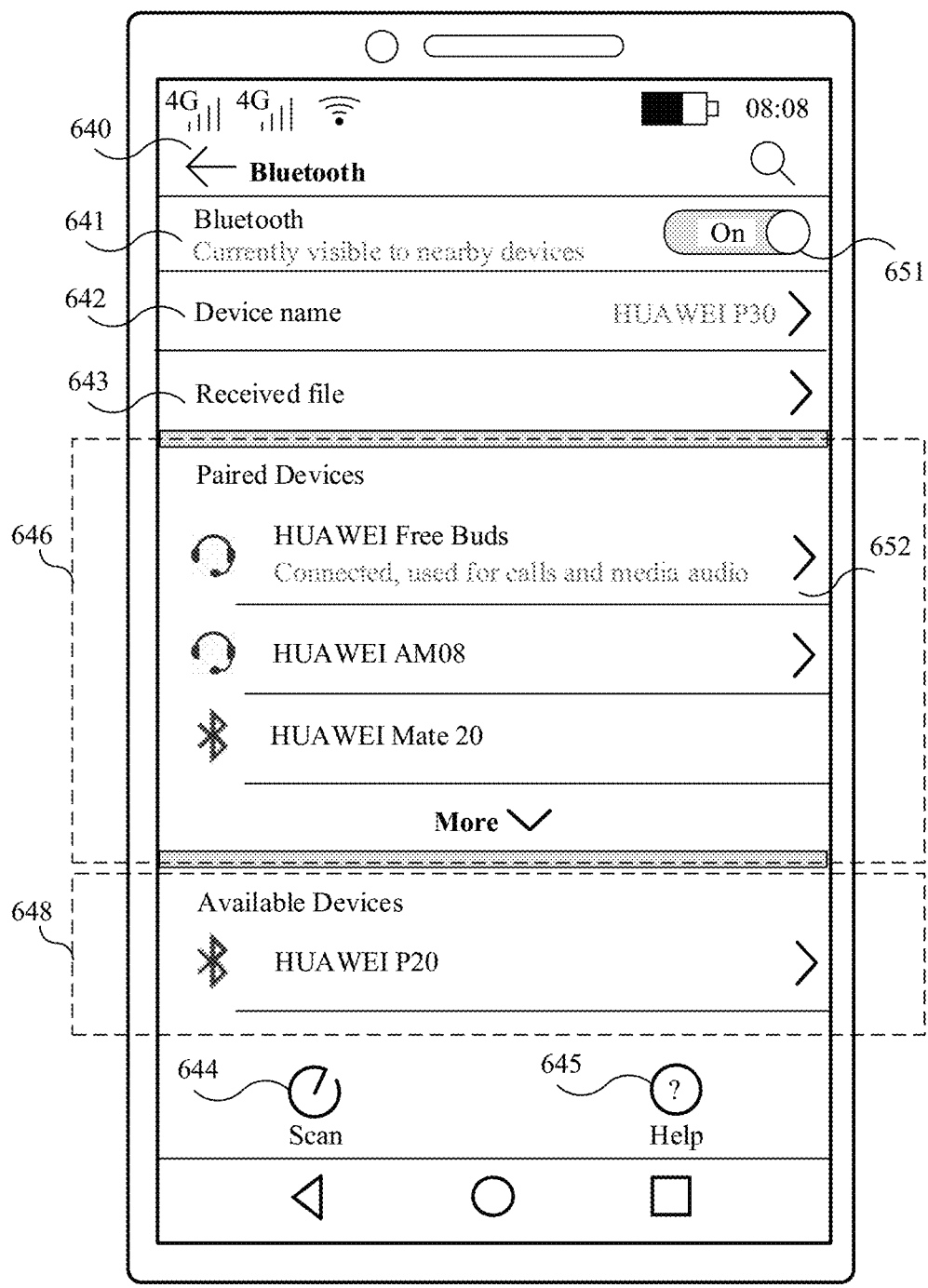

As shown in FIG. 6G, after the terminal 100 and the Bluetooth device 200 complete pairing and authentication, the terminal 100 may display a device option 652 of the Bluetooth device 200 in the Paired Devices list 646. The device option 652 of the Bluetooth device 200 may display "Paired, used for calls and media audio".

S507: The terminal 100 and the Bluetooth device 200 establish a service connection.

For example, when the terminal 100 finds, through an SDP service inquiry, that the Bluetooth device 200 can support the HFP, if the terminal 100 needs to transmit an HFP-based control instruction, the terminal 100 may establish an RFCOMM connection to the Bluetooth device 200, and then obtain an RFCOMM channel number corresponding to the HFP. Then, the terminal 100 and the Bluetooth device may establish a service connection based on an HFP function, and transmit the HFP-based control instruction.

In some related technologies, after the terminal 100 and the Bluetooth device 200 establish the ACL link, the terminal 100 needs to obtain battery level information of the Bluetooth device 200, and display the battery level information of the Bluetooth device 200 to the user, to notify the user to charge the Bluetooth device 200 in a timely manner.

Figure 8:
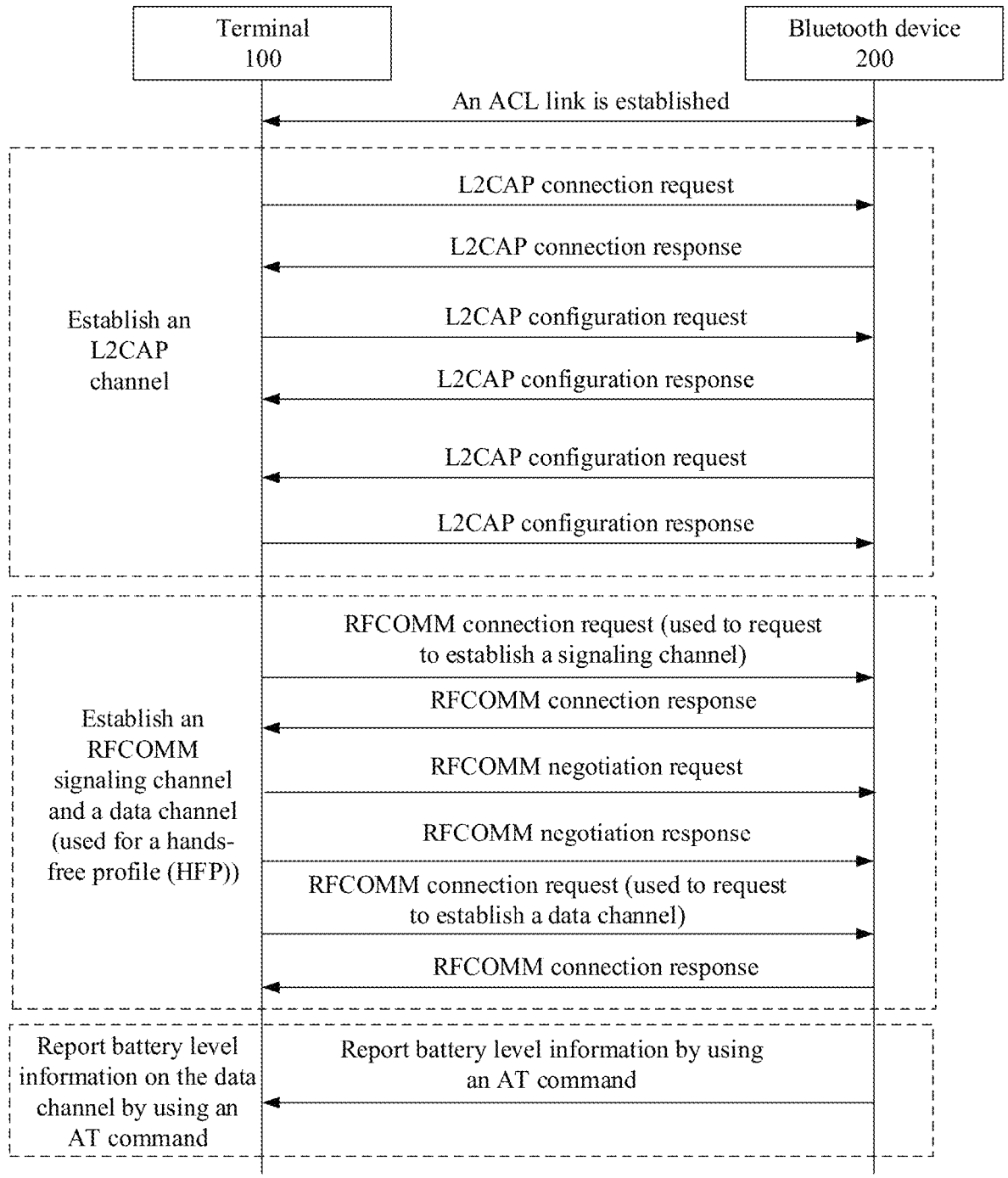
FIG. 8 is a schematic flowchart of reporting a battery level of a Bluetooth device in a related technology of this application.

As shown in FIG. 8, after the terminal 100 and the Bluetooth device 200 establish the ACL link, before the terminal 100 obtains the battery level information of the Bluetooth device 200, the following operations need to be performed:

1. The terminal 100 and the Bluetooth device 200 establish an L2CAP dynamic channel.

The terminal 100 may send an L2CAP connection request to the Bluetooth device 200 on the L2CAP signaling channel. After receiving the L2CAP connection request, the Bluetooth device 200 may return an L2CAP connection response to the terminal 100 on the L2CAP signaling channel. Then, after receiving the connection response returned by the Bluetooth device 200, the terminal 100 may send a configuration request to the Bluetooth device 200. After receiving the configuration request sent by the terminal 100, the Bluetooth device 200 may return a configuration response to the terminal 100. The Bluetooth device 200 may alternatively actively send a configuration request to the terminal 100. After receiving the configuration request sent by the Bluetooth device 200, the terminal 100 may return a configuration response to the Bluetooth device 200.

The requester (namely, a device that sends a configuration request) may configure the following parameters based on the configuration request: a maximum transmission unit of receiving performed by the requester, a maximum refresh time of sending performed by the requester, sending quality of service of the requester, and input flow control and error control information of the requester.

A responder (namely, a device that returns a configuration response) may configure the following parameters based on the configuration response: a maximum transmission unit of an output performed by the responder, a refresh timeout period of the requester, a receiving quality of service flow requirement of the responder, and flow control and error control information of the responder.

The L2CAP dynamic channel is established between the terminal 100 and the Bluetooth device 200 through configuration interaction (the configuration request and response) between the terminal 100 and the Bluetooth device 200.

2. The terminal 100 and the Bluetooth device 20 establish an RFCOMM signaling channel and an RFCOMM data channel used for a hands-free profile (HFP).

The terminal 100 may send an RFCOMM connection request to the Bluetooth device 200, to request to establish the RFCOMM signaling channel with the Bluetooth device 200. After receiving the RFCOMM connection request sent by the terminal 100, the Bluetooth device 200 may return an RFCOMM connection response to the terminal 100. Therefore, establishment of the RFCOMM signaling channel between the terminal 100 and the Bluetooth device 200 is completed.

The terminal 100 and the Bluetooth device 200 may complete parameter negotiation on an RFCOMM channel through the RFCOMM signaling channel. For example, the terminal 100 may send an RFCOMM negotiation request to the Bluetooth device 200 on the RFCOMM signaling channel. The Bluetooth device 200 may send an RFCOMM negotiation response to the terminal 100 on the RFCOMM signaling channel. The terminal 100 and the Bluetooth device 200 may complete parameter configuration on the RFCOMM channel based on the negotiation request and the negotiation response.

The terminal 100 and the Bluetooth device 200 may establish the RFCOMM data channel used for the HFP. For example, the terminal 100 may send the RFCOMM connection request to the Bluetooth device 200 through the RFCOMM signaling channel, to establish, with the Bluetooth device 200, the RFCOMM data channel used for the HFP. After receiving the RFCOMM connection request sent by the terminal 100, the Bluetooth device 200 may return the RFCOMM connection response to the terminal 100. Therefore, establishment of the RFCOMM data channel that is used for the HFP and that is between the terminal 100 and the Bluetooth device 200 is completed.

3. The Bluetooth device 200 reports, on the RFCOMM data channel used for the HFP, a battery level by using an attention command (AT command).

It can be learned from the foregoing related technology that, before reporting the battery level to the terminal 100, the Bluetooth device 200 needs to first establish the L2CAP dynamic channel. Then, the RFCOMM signaling channel and the RFCOMM data channel used for the HFP are established. Finally, the Bluetooth device 200 reports the battery level to the terminal 100 by using the AT command. Consequently, there is a long process in which the Bluetooth device 200 reports the battery level.

Therefore, in an embodiment of the application, after the ACL link between the terminal 100 and the Bluetooth device 200 succeeds, the L2CAP signaling channel already exists. Signaling commands on the L2CAP signaling channel include an echo request command and an echo response command. The Bluetooth device 200 may report battery level information based on the echo request command, to omit a process of establishing the L2CAP dynamic channel and a process of establishing an RFCOMM data channel used to report the battery level, and reduce a period of time in which the terminal 100 obtains the battery level reported by the Bluetooth device 200.

Figure 9:
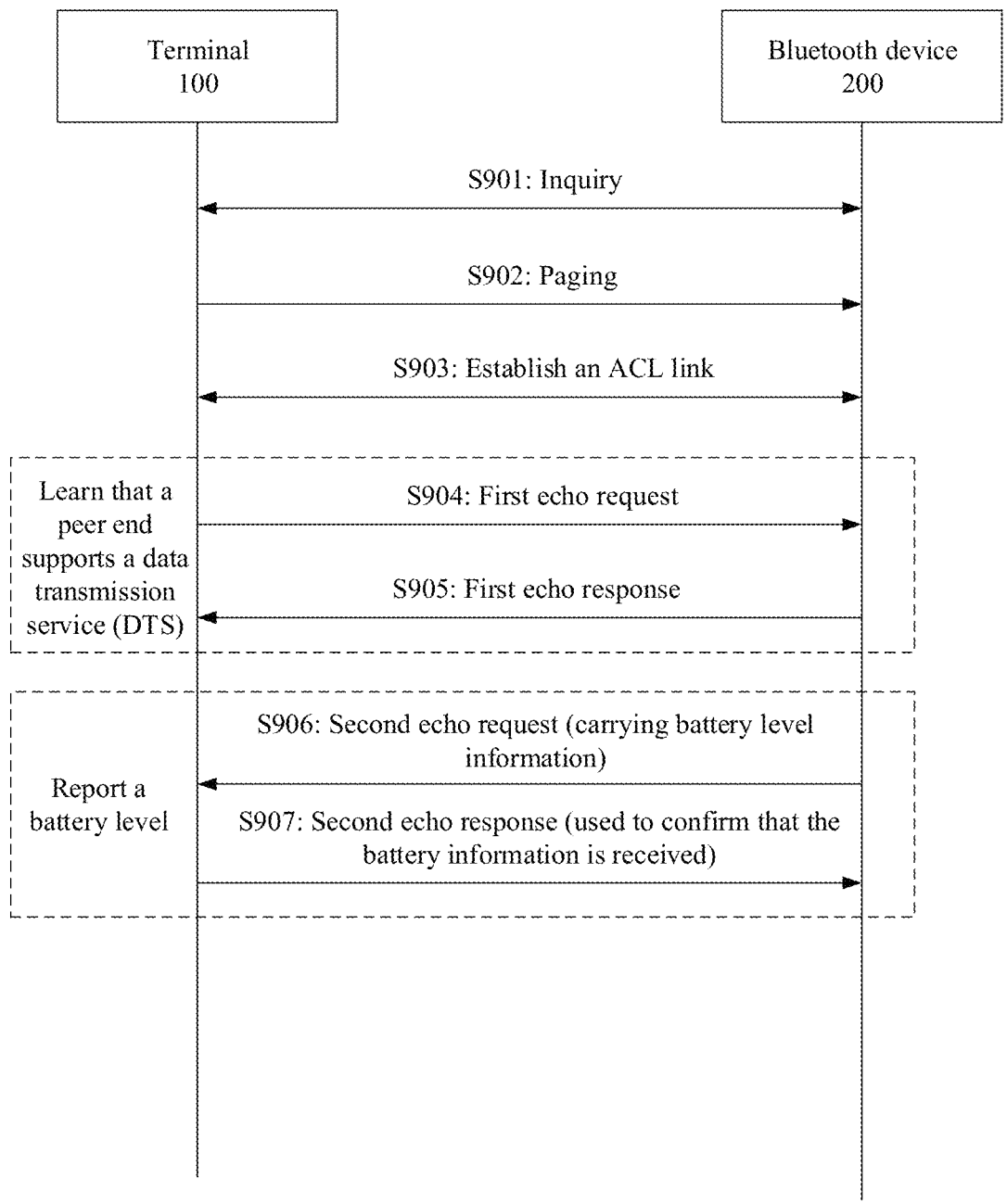
FIG. 9 is a schematic flowchart of a Bluetooth connection method according to another embodiment of this application.

FIG. 9 shows a Bluetooth connection method according to an embodiment of this application. As shown in FIG. 9, the method includes the following operations.

S901: A terminal 100 and a Bluetooth device 200 perform an inquiry.

For example, refer to operation S501 in the embodiment shown in FIG. 5. Details are not described herein again.

S902: The terminal 100 and the Bluetooth device 200 perform paging.

For example, refer to operation S502 in the embodiment shown in FIG. 5. Details are not described herein again.

S903: The terminal 100 and the Bluetooth device 200 establish an ACL link.

For example, refer to operation S503 in the embodiment shown in FIG. 5. Details are not described herein again.

S904: The terminal 100 sends a first echo request to the Bluetooth device 200 through an L2CAP signaling channel. The first echo request carries service information of the terminal 100. The first echo request is used to notify the Bluetooth device 200 of the service information of the terminal 100, and to request the Bluetooth device 200 to return service information of the Bluetooth device 200 to the terminal 100.

The terminal 100 may support management of a data transmission service (DTS). Therefore, after receiving the first echo request sent by the terminal 100, the Bluetooth device 200 may learn that the terminal 100 supports the DTS. For a signaling format of the first echo request, refer to the embodiment shown in FIG. 6A. Details are not described herein again.

S905: The Bluetooth device 200 sends a first echo response to the terminal 100 through the L2CAP signaling channel. The first echo response carries the service information. The service information includes a service function supported by the Bluetooth device 200.

The Bluetooth device 200 may support management of the data transmission service (DTS). Therefore, after receiving the first echo response sent by the Bluetooth device 200, the terminal 100 may learn that the Bluetooth device 200 supports management of the DTS. For a signaling format of the first echo request, refer to the embodiment shown in FIG. 6B. Details are not described herein again.

S906: The Bluetooth device 200 sends a second echo request to the terminal 100 through the L2CAP signaling channel. The second echo request carries battery level information of the Bluetooth device 200.

Figure 10A:
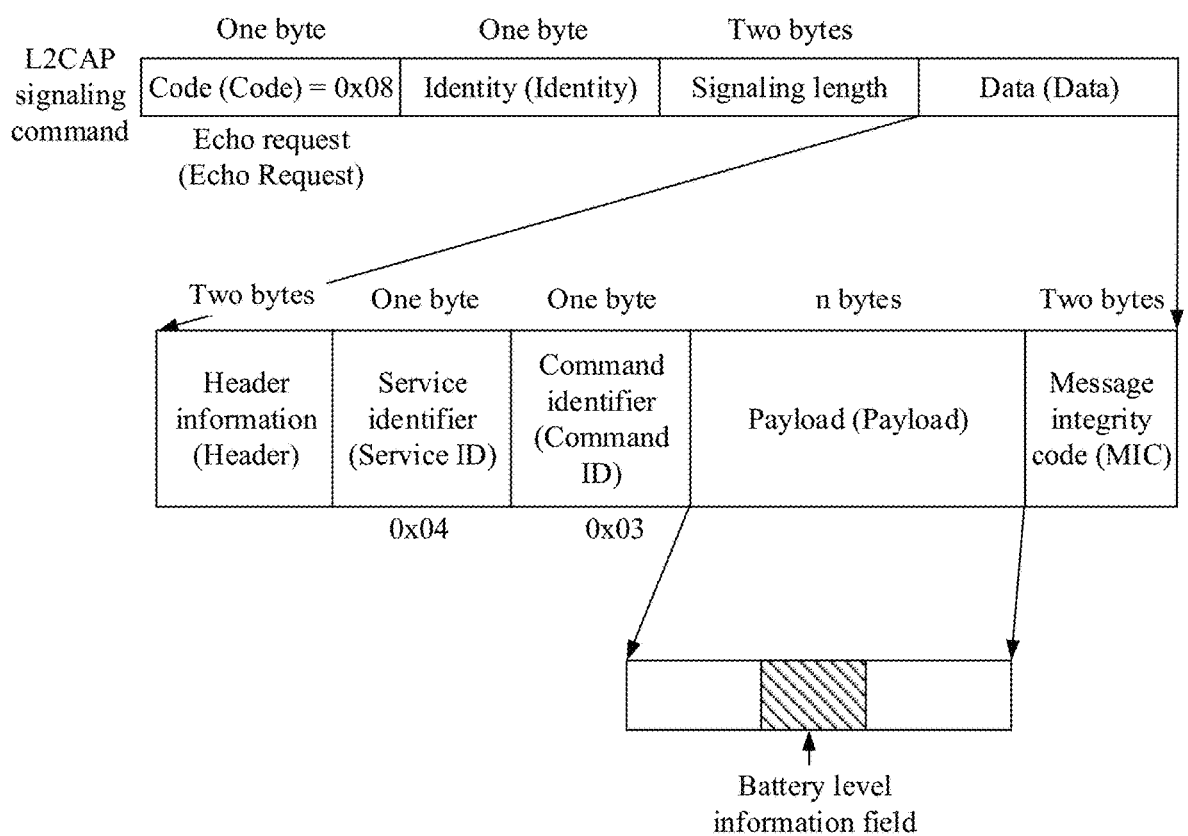
FIG. 10A is a schematic diagram of a signaling format of an echo request according to another embodiment of this application.

For a signaling format of the second echo request, refer to FIG. 10A. As shown in FIG. 10A, the second echo request may include a code field, an identity field, a signaling length field, and a data field.

1. A value of the code field of the second echo request is "0x08", and is used to indicate that the second echo request is an echo request signaling type in L2CAP signaling.
2. The identifier field of the second echo request occupies one byte. For a text description of the identifier field, refer to a text description of the first echo request in the embodiment shown in FIG. 7A.
3. The signaling length field of the second echo request occupies two bytes, and is only used to indicate a size of a command data field in bytes. To be specific, the side of the data field does not include the code, the identifier, and the signaling length field.
4. The data field of the second echo request occupies any quantity of bytes. A length of the data field is variable. The length of the data field may be obtained based on the signaling length field. The code field determines a format of the data field. The data field of the second echo request includes a service instruction type of the echo request and the battery level information of the Bluetooth device 200. The service instruction type identifies that the second echo request is used to report a battery level.

For example, as shown in FIG. 10A, the data field of the second echo request includes a header information field, a service identifier (Service ID) field, a command identifier (Command ID) field, a payload field, and a message integrity code (MIC) field. The message integrity code field is used by the terminal 100 to verify data integrity of the data field of the second echo request after receiving the second echo request.

The header information field may include an identifier used as data of an L2CAP echo message, version information of the L2CAP echo message, and the like, and the header information field may occupy one byte. The service identifier field may occupy one byte. The command identifier field may occupy one byte. The service identifier field and the command identifier field determine the service instruction type of the first echo request. For example, when a value of the service identifier field is "0x04" and a value of the command identifier field is "0x03", it may indicate that the service instruction type of the second echo request is "Battery level report". The payload field includes a battery level information field, and the battery level information field includes the battery level information of the Bluetooth device 200.

S907: The terminal 100 sends a second echo response to the Bluetooth device 200 through the L2CAP signaling channel. The second echo response is used to notify the Bluetooth device 200 that the terminal 100 confirms that the battery level information is received.

Figure 10B:
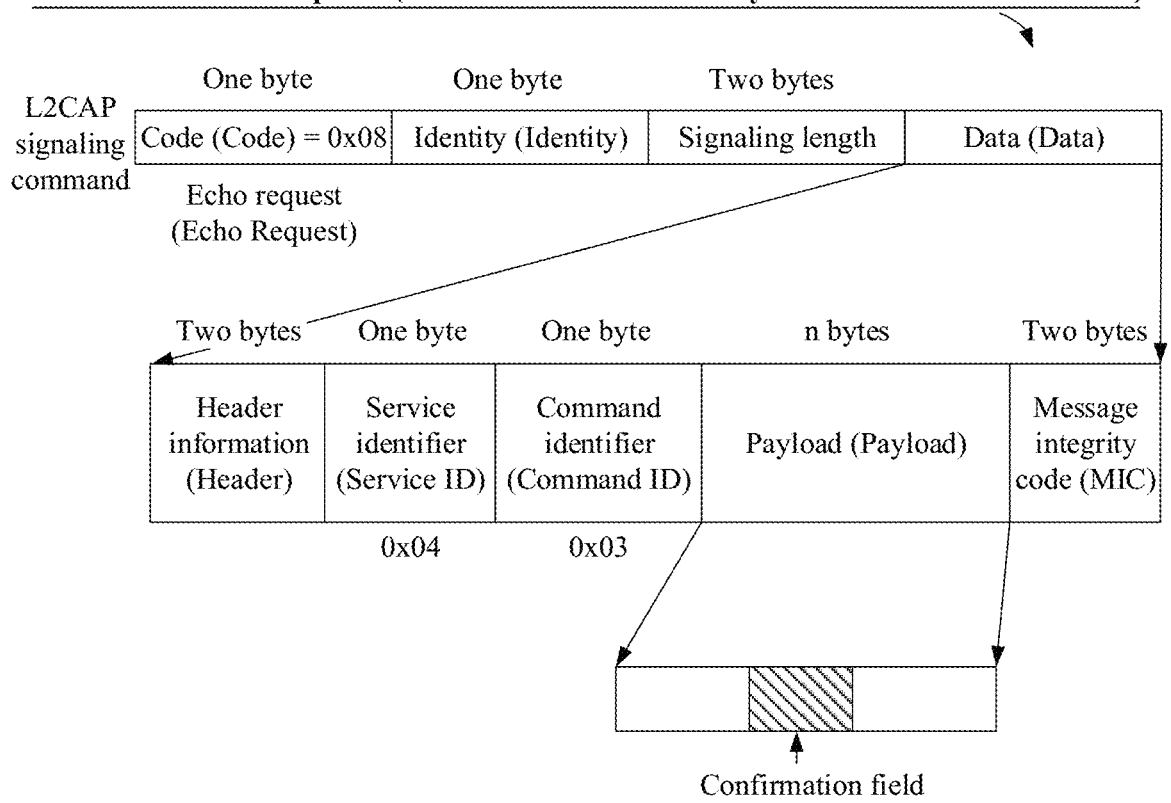
FIG. 10B is a schematic diagram of a signaling format of an echo response according to another embodiment of this application.

As shown in FIG. 10B, a signaling format of the second echo response is the same as a signaling format of the second echo request in FIG. 10A. The second echo response includes a code field, an identity field, a signaling length field, and a data field.

A value of the code field of the second echo response is "0x09", and it indicates that the second echo response is echo response signaling in L2CAP signaling. The data field of the second echo response includes a service instruction type of the echo response and battery level receiving feedback information. The service instruction type identifies that the second echo response is used for a battery level information receiving feedback. The battery level receiving feedback information is used to represent that the terminal 100 has received the battery level information reported by the Bluetooth device 200.

For example, as shown in FIG. 10B, the data field of the second echo response includes a header information field, a service identifier (Service ID) field, a command identifier (Command ID) field, a payload field, and a message integrity code (MIC) field. The message integrity code field is used by the Bluetooth device 200 to verify data integrity of the data field of the second echo response after receiving the second echo response.

The header information field may include an identifier used as data of an L2CAP echo message, version information of the L2CAP echo message, and the like, and the header information field may occupy one byte. The service identifier field may occupy one byte. The command identifier field may occupy one byte. The service identifier field and the command identifier field determine a service instruction type of the first echo response. For example, when a value of the service identifier field is "0x04" and a value of the command identifier field is "0x03", it may indicate that the service instruction type of the second echo response is "Battery level information receiving feedback". The payload field includes the battery level receiving feedback information, and is used to represent that the terminal 100 has received the battery level information reported by the Bluetooth device 200.

In some embodiments, when the terminal 100 and the Bluetooth device 200 establish the ACL link, and complete encryption of the established ACL link, the Bluetooth device 200 may send current battery level information of the Bluetooth device 200 to the terminal 100 by using L2CAP echo request signaling.

In some embodiments, when a battery level of the Bluetooth device 200 satisfies a preset change, the Bluetooth device 200 may send the current battery level information of the Bluetooth device 200 to the terminal 100 by using L2CAP echo request signaling. The preset change may include a specified value of a drop in a percentage of the battery level. For example, the specified value may be 1% of a total battery level of a battery of the Bluetooth device 200. If the percentage of the battery level of the Bluetooth device 200 drops from 100% to 99%, the Bluetooth device 200 sends the current battery level information (99%) of the Bluetooth device 200 to the terminal 100 by using an echo request. For another example, the specified value may be 25% of a total battery level of a battery of the Bluetooth device 200. If the percentage of the battery level of the Bluetooth device 200 drops from 100% to 75%, the Bluetooth device 200 sends the current battery level information (75%) of the Bluetooth device 200 to the terminal 100 by using an echo request. The foregoing example is merely used to explain this application and shall not be construed as a limitation.

In some embodiment, when the Bluetooth device 200 is a true wireless stereo (TWS) headset, when a headset box is switched from an open state to a closed state, the Bluetooth device 200 may send the current battery level information of the Bluetooth device 200 to the terminal 100 by using L2CAP echo request signaling.

Figure 10C:
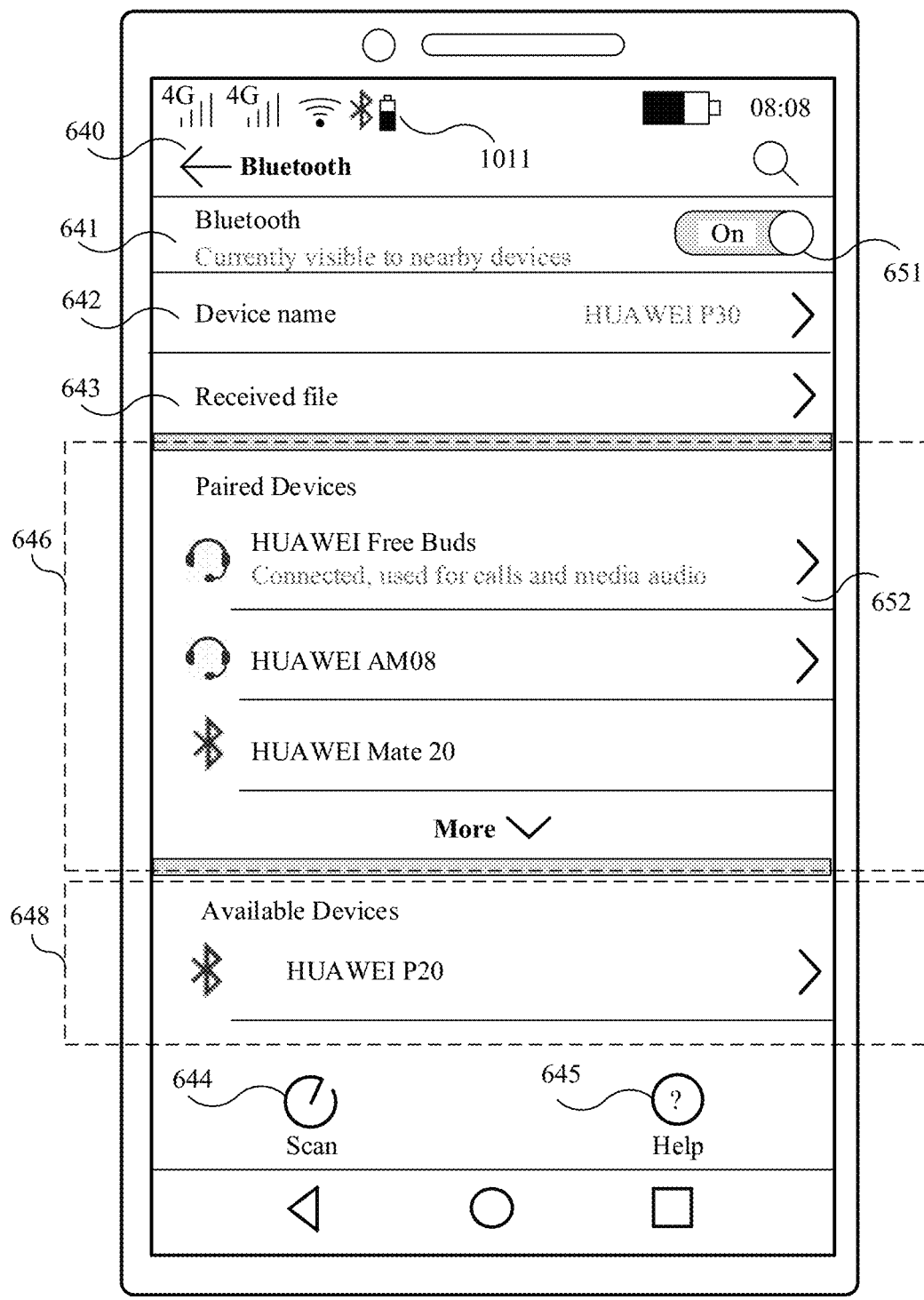
FIG. 10C to FIG. 10D are schematic diagrams of a group of interfaces according to an embodiment of this application.

For example, as shown in FIG. 10C, after obtaining the battery level information sent by the Bluetooth device 200, the terminal 100 may display a battery level indicator of the Bluetooth device 200 on a status bar at the top of a touchscreen of the terminal 100 based on the battery level information of the Bluetooth device 200. The battery level indicator is used to indicate a current battery level status of the Bluetooth device 200.

Figure 10D:
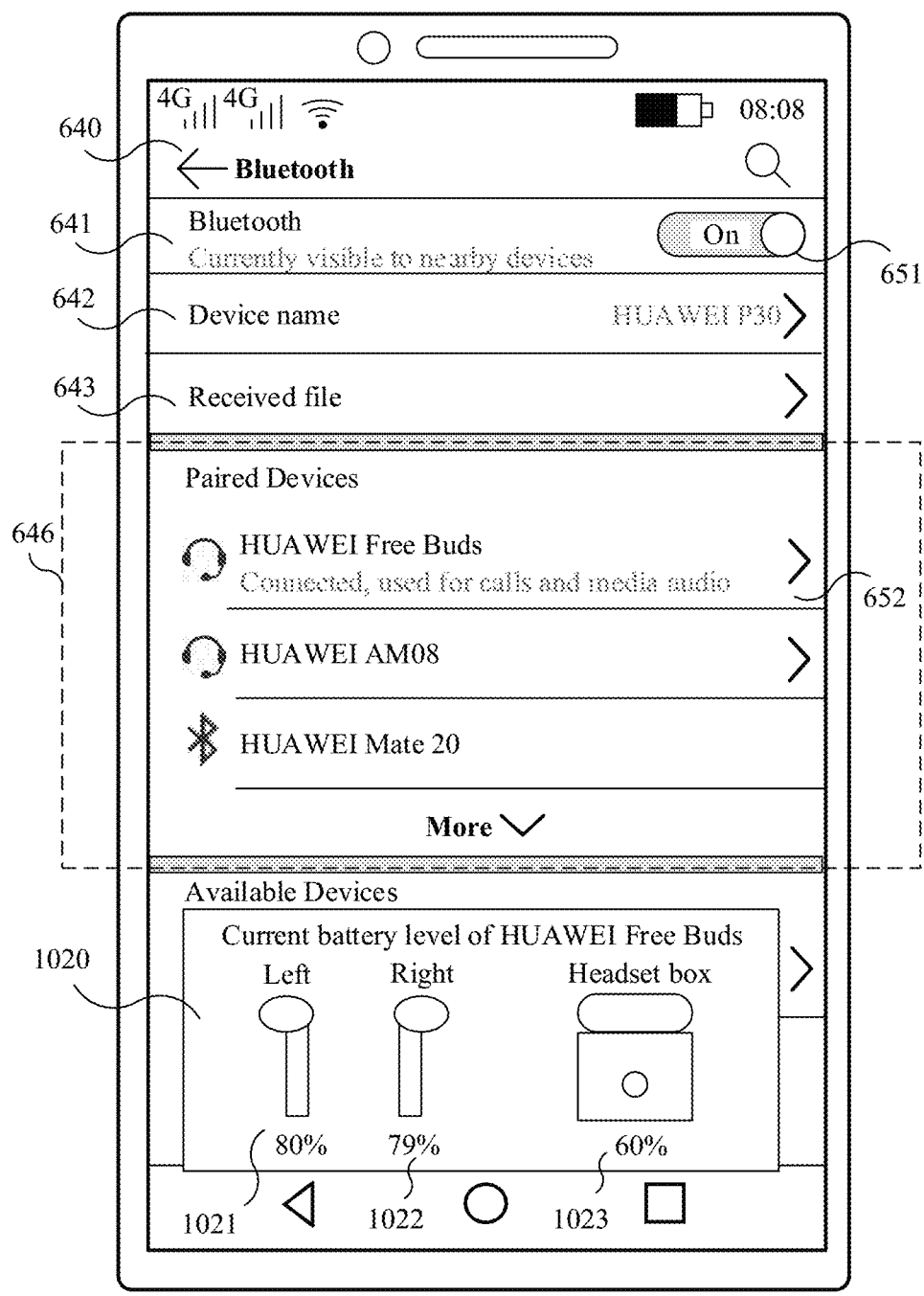

For another example, as shown in FIG. 10D, the Bluetooth device 200 may be a TWS Bluetooth headset, and the Bluetooth device 200 may include a left headset, a right headset, and a headset box. A device name of the Bluetooth device 200 may be "HUAWEI Free Buds". After the terminal 100 obtains the battery level information sent by the Bluetooth device 200, a battery level display box 1020 may pop up. The battery level information may include a battery level of the left headset, a battery level of the right headset, and a battery level of the headset box that are of the Bluetooth device 200. The battery level display box 1020 may include the battery level (for example, 80%) 1021 of the left headset of the Bluetooth device 200, the battery level (for example, 79%) 1022 of the right headset of the Bluetooth device 200, and the battery level (for example, 60%) 1023 of the headset box of the Bluetooth device 200.

The examples shown in FIG. 10C and FIG. 10D are merely used to explain this application, and should not constitute a limitation. A manner in which the terminal 100 displays the Bluetooth device 200 is not limited to that in FIG. 10C and FIG. 10D, and there may be another manner. For example, the terminal 100 may further display the battery level information of the Bluetooth device 200 on a Bluetooth setting interface or a minus one screen of a home screen. This is not limited in this application.

In some related technologies, after the terminal 100 and the Bluetooth device 200 establish the ACL link, the terminal 100 may exchange some private parameter information with the Bluetooth device 200 based on a serial port profile (SPP), to complete some private service functions of a device manufacturer. For example, the Bluetooth device 200 wakes up a voice assistant on the terminal 100, and the Bluetooth device 200 reports location information to the terminal 100.

Figure 11:
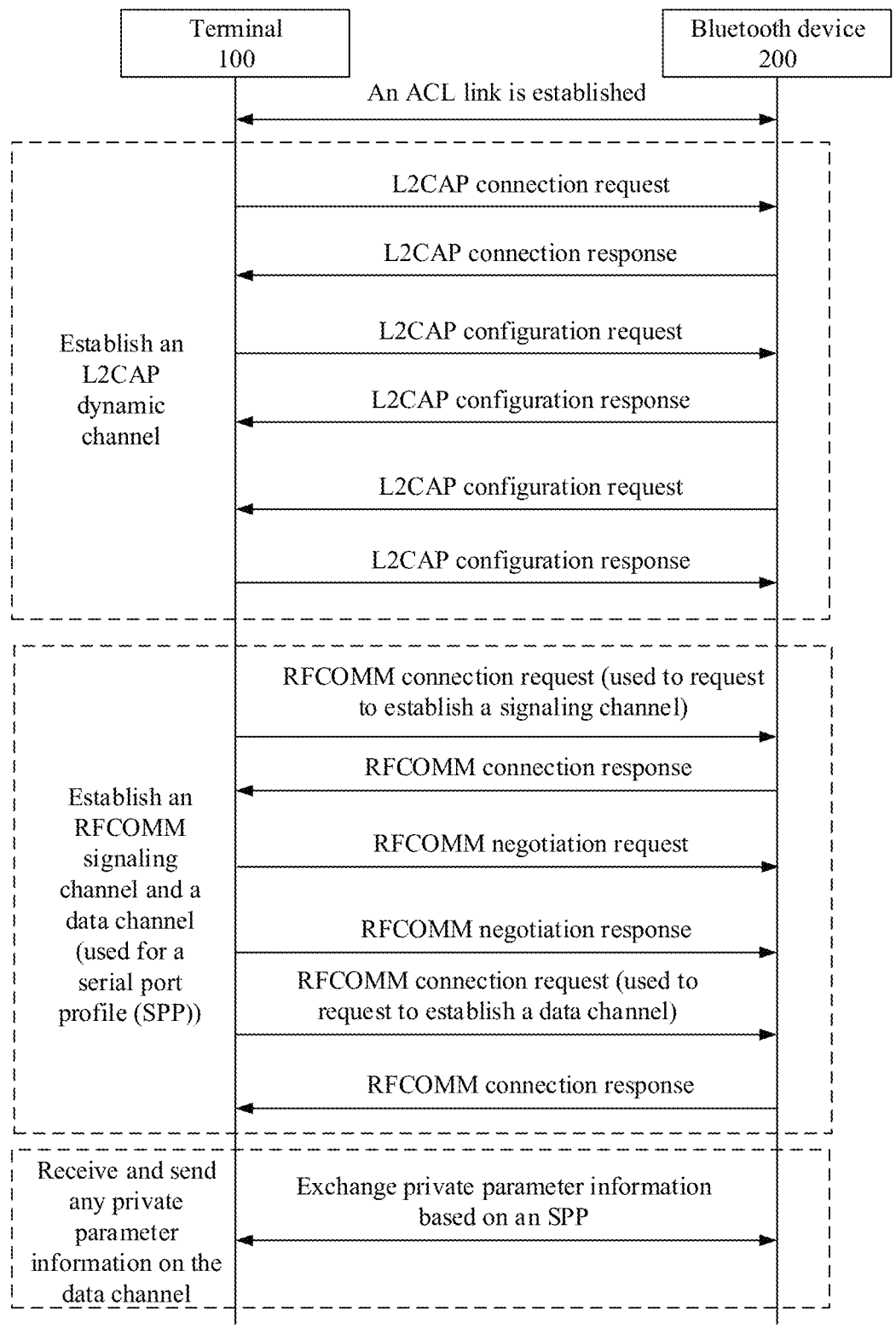
FIG. 11 is a schematic flowchart of a private parameter exchange in a related technology of this application.

As shown in FIG. 11, after the terminal 100 and the Bluetooth device 200 establish the ACL link, before the terminal 100 exchanges some private parameter information with the Bluetooth device 200, the following operations need to be performed.

1. The terminal 100 and the Bluetooth device 200 establish an L2CAP dynamic channel.

For example, refer to the text description in a related technology shown in FIG. 8.

2. The terminal 100 and the Bluetooth device 20 establish an RFCOMM signaling channel and an RFCOMM data channel used for a hands-free profile (HFP).

The terminal 100 may send an RFCOMM connection request to the Bluetooth device 200, to request to establish the RFCOMM signaling channel with the Bluetooth device 200. After receiving the RFCOMM connection request sent by the terminal 100, the Bluetooth device 200 may return an RFCOMM connection response to the terminal 100. Therefore, establishment of the RFCOMM signaling channel between the terminal 100 and the Bluetooth device 200 is completed.

The terminal 100 and the Bluetooth device 200 may complete parameter negotiation on an RFCOMM channel through the RFCOMM signaling channel. For example, the terminal 100 may send an RFCOMM negotiation request to the Bluetooth device 200 on the RFCOMM signaling channel. The Bluetooth device 200 may send an RFCOMM negotiation response to the terminal 100 on the RFCOMM signaling channel. The terminal 100 and the Bluetooth device 200 may complete parameter configuration on the RFCOMM channel based on the negotiation request and the negotiation response.

The terminal 100 and the Bluetooth device 200 may establish an RFCOMM data channel used for the serial port profile (SPP). For example, the terminal 100 may send the RFCOMM connection request to the Bluetooth device 200 through the RFCOMM signaling channel, to establish, with the Bluetooth device 200, the RFCOMM data channel used for the SPP. After receiving the RFCOMM connection request sent by the terminal 100, the Bluetooth device 200 may return the RFCOMM connection response to the terminal 100. Therefore, establishment of the RFCOMM data channel that is used for the SPP and that is between the terminal 100 and the Bluetooth device 200 is completed.

3. The terminal 100 and the Bluetooth device 200 exchange the private parameter information on the RFCOMM data channel used for the SPP.

It can be learned from the foregoing related technology that, before reporting the battery level to the terminal 100, the Bluetooth device 200 needs to first establish the L2CAP dynamic channel. Then, the RFCOMM signaling channel and the RFCOMM data channel used for the HFP are established. Finally, the Bluetooth device 200 reports the battery level to the terminal 100 by using the AT command. Consequently, there is a long process in which the Bluetooth device 200 reports the battery level.

Therefore, in an embodiment of the application, after the ACL link between the terminal 100 and the Bluetooth device 200 succeeds, the L2CAP signaling channel already exists. Signaling commands on the L2CAP signaling channel include an echo request command and an echo response command. The terminal 100 and the Bluetooth device 200 may exchange the private parameter information based on the echo request command and the echo response command, to omit the process of establishing the L2CAP dynamic channel and a process of establishing the RFCOMM data channel used for the SPP, and reduce a period of time in which the terminal 100 and the Bluetooth device 200 exchange the private parameter information.

Figure 12:
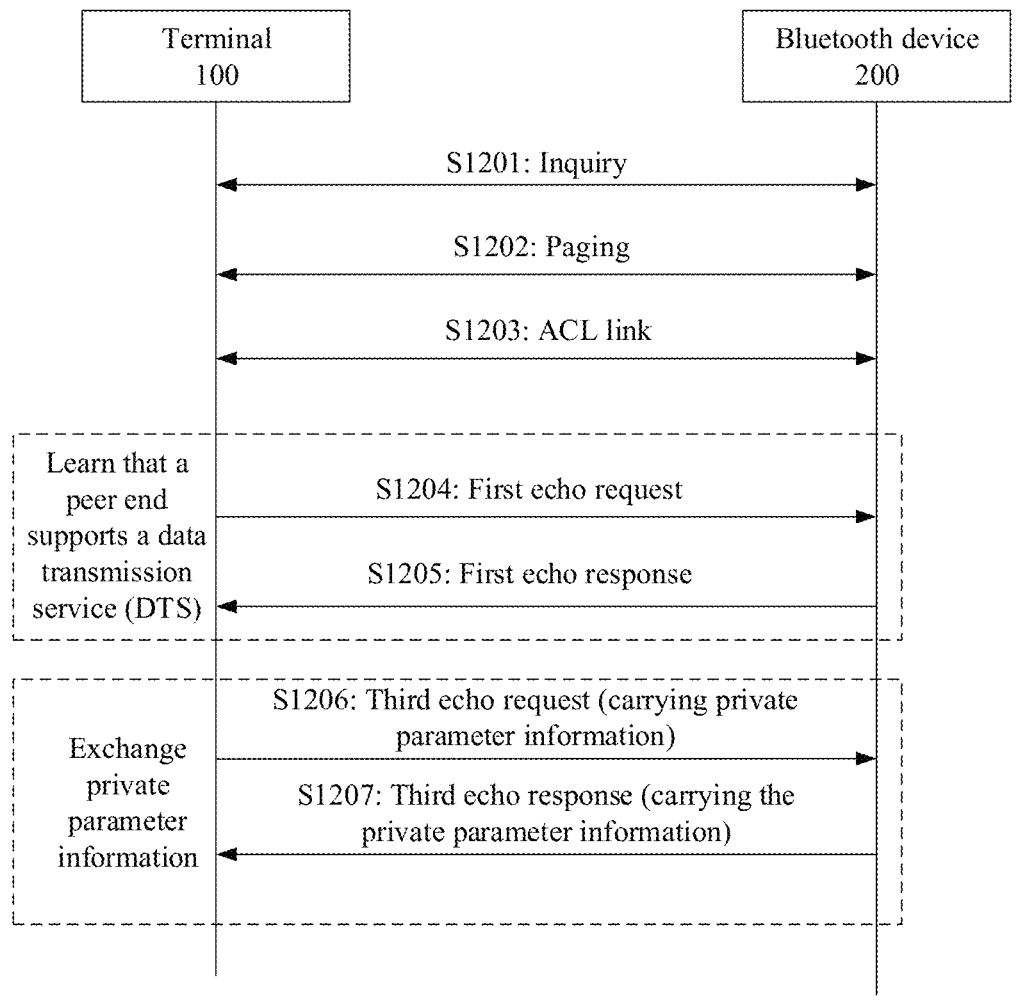
FIG. 12 is a schematic flowchart of a Bluetooth connection method according to another embodiment of this application.

FIG. 12 shows a Bluetooth connection method according to an embodiment of this application. As shown in FIG. 12, the method includes the following operations.

S1201: A terminal 100 and a Bluetooth device 200 perform an inquiry.

For example, refer to operation S501 in the embodiment shown in FIG. 5. Details are not described herein again.

S1202: The terminal 100 and the Bluetooth device 200 perform paging.

For example, refer to operation S502 in the embodiment shown in FIG. 5. Details are not described herein again.

S1203: The terminal 100 and the Bluetooth device 200 establish an ACL link.

For example, refer to operation S503 in the embodiment shown in FIG. 5. Details are not described herein again.

S1204: The terminal 100 sends a first echo request to the Bluetooth device 200 through an L2CAP signaling channel. The first echo request carries service information of the terminal 100. The first echo request is used to notify the Bluetooth device 200 of the service information of the terminal 100, and to request the Bluetooth device 200 to return service information of the Bluetooth device 200 to the terminal 100.

The terminal 100 may support management of a data transmission service (DTS). Therefore, after receiving the first echo request sent by the terminal 100, the Bluetooth device 200 may learn that the terminal 100 supports the DTS. For a signaling format of the first echo request, refer to the embodiment shown in FIG. 6A. Details are not described herein again.

S1205: The Bluetooth device 200 sends a first echo response to the terminal 100 through the L2CAP signaling channel. The first echo response carries the service information. The service information includes a service function supported by the Bluetooth device 200.

The Bluetooth device 200 may support management of the data transmission service (DTS). Therefore, after receiving the first echo response sent by the Bluetooth device 200, the terminal 100 may learn that the Bluetooth device 200 supports management of the DTS. For a signaling format of the first echo request, refer to the embodiment shown in FIG. 6B. Details are not described herein again.

S1206: The terminal 100 may send a third echo request to the Bluetooth device 200 through the L2CAP signaling channel. The third echo request carries private parameter information of the terminal 100.

The private parameter information of the terminal 100 includes but is not limited to audio scene information of the terminal 100, user scene information, and a device type of the terminal 100. The audio scene information may include a system tone scene, a ring tone scene, a warning tone scene, a notification tone scene, a music scene, a video scene, a game scene, a voice message scene, and the like. The user scene may include a static walking scene, a running scene, a cycling scene, and the like. The device type of the terminal may include a mobile phone, a tablet computer, and the like.

Figure 13A:
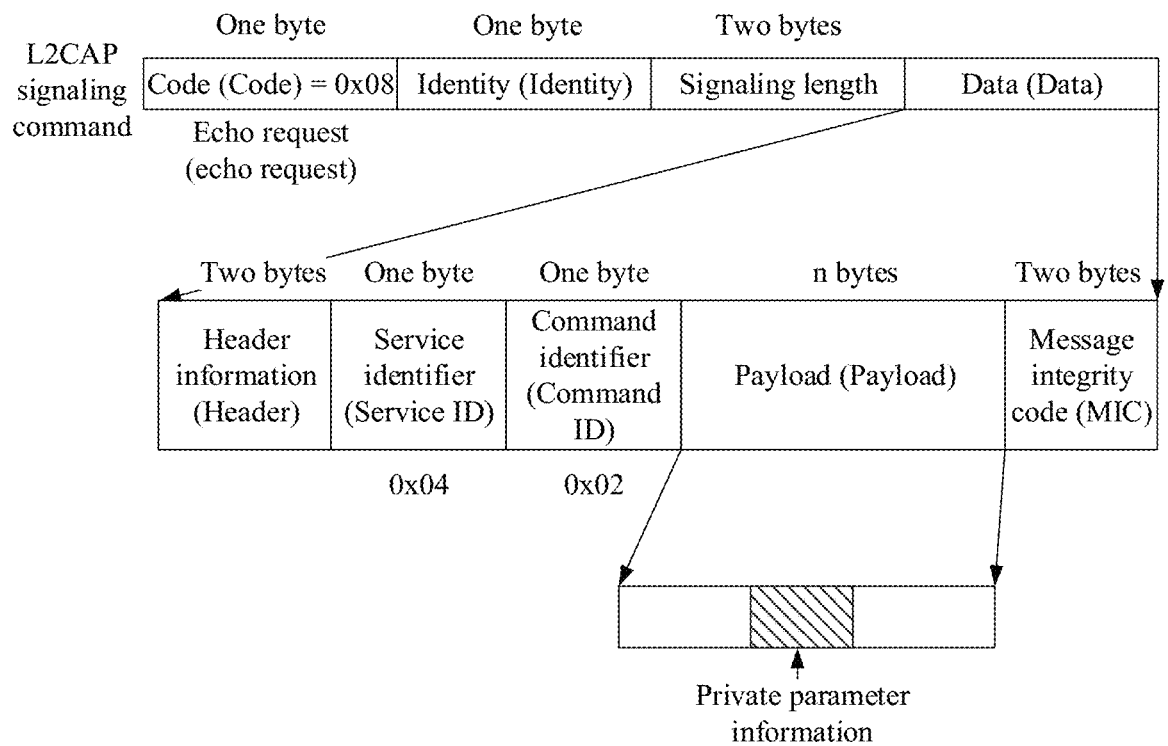
FIG. 13A is a schematic diagram of a signaling format of an echo request according to another embodiment of this application.

For a signaling format of the third echo request, refer to FIG. 13A. As shown in FIG. 13A, the third echo request may include a code field, an identity field, a signaling length field, and a data field.

A value of the code field in the third echo request is "0x08", and it indicates that the third echo request is echo request signaling in L2CAP signaling. The data field of the third echo request includes a service instruction type of the echo request and the private parameter information. The service instruction type identifies that the third echo request is used for a private parameter exchange.

For example, as shown in FIG. 13A, the data field of the third echo request includes a header information (Header) field, a service identifier (Service ID) field, a command identifier (Command ID) field, a payload field, and a message integrity code (MIC) field. The message integrity code field is used to verify data integrity of the data field.

The header information field may include an identifier used as data of an L2CAP echo message, version information of the L2CAP echo message, and the like, and the header information field may occupy one byte. The service identifier field may occupy one byte. The command identifier field may occupy one byte. The service identifier field and the command identifier field determine the service instruction type of the third echo request. For example, when a value of the service identifier field is "0x04" and a value of the command identifier field is "0x02", it may indicate that the service instruction type of the third echo request is "Exchange private parameter information". The payload field includes the private parameter information.

S1207: The Bluetooth device 200 may send a third echo response to the Bluetooth device 200 through the L2CAP signaling channel. The third echo response carries private parameter information of the Bluetooth device 200.

The private parameter information of the Bluetooth device 200 may include but is not limited to the following information: wearing detection information of the Bluetooth device 200 and/or a device type of the Bluetooth device 200. The wearing detection information is used to indicate whether the Bluetooth device 200 is correctly worn by a user. The Bluetooth device 200 may detect, by using a sensor (for example, an optical proximity sensor), whether the Bluetooth device is correctly worn by the user. The device type of the Bluetooth device 200 may include a watch, a TWS headset, a speaker, Bluetooth glasses, and the like.

Figure 13B:
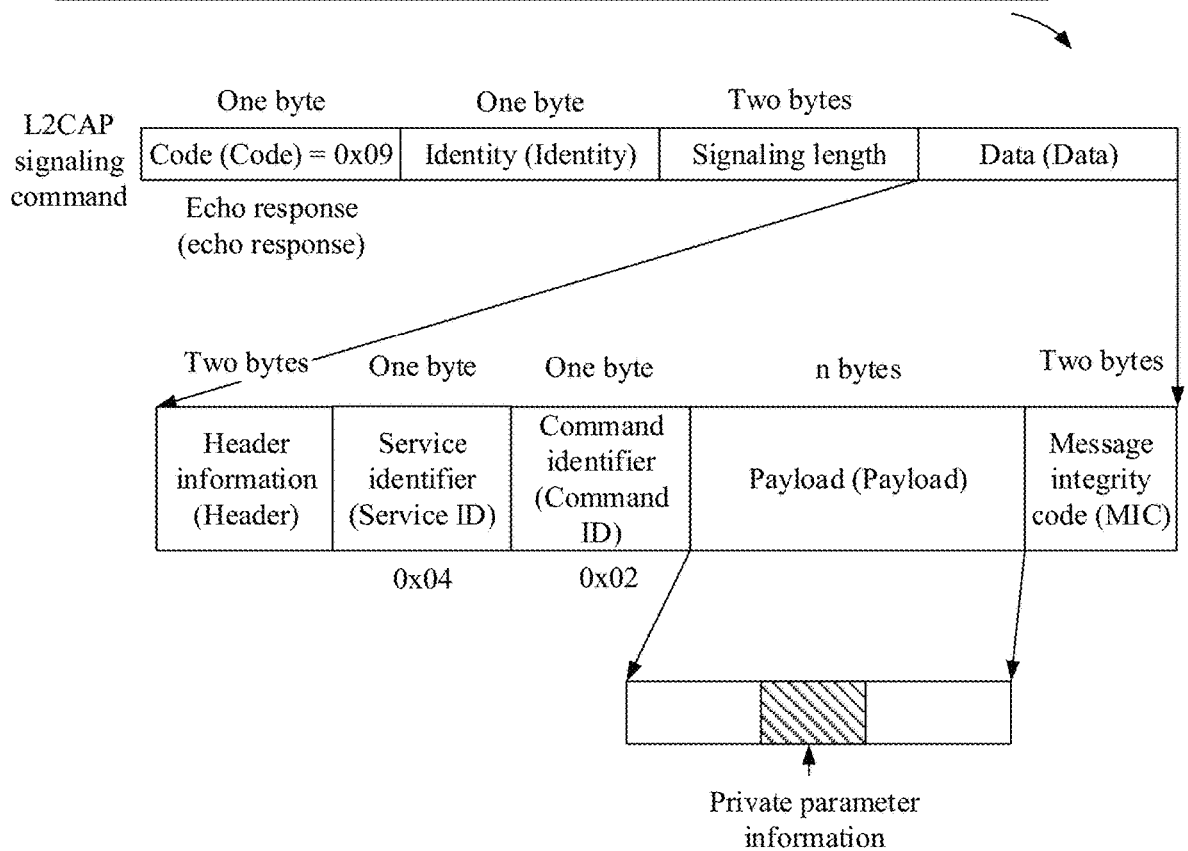
FIG. 13B is a schematic diagram of a signaling format of an echo response according to another embodiment of this application.

For a signaling format of the third echo response, refer to FIG. 13B. As shown in FIG. 13B, the third echo response may include a code field, an identity field, a signaling length field, and a data field.

A value of the code field of the third echo response is "0x09", and it indicates that the third echo response is echo response signaling in L2CAP signaling. The data field of the third echo response includes a service instruction type of the echo response and the private parameter information. The service instruction type identifies that the third echo response is used to exchange the private parameter information.

For example, as shown in FIG. 13B, the data field of the third echo response includes a header information field, a service identifier (Service ID) field, a command identifier (Command ID) field, a payload field, and a message integrity code (MIC) field. The message integrity code field is used to verify data integrity of the data field.

The header information field may include an identifier used as data of an L2CAP echo (echo) message, version information of the L2CAP echo message, and the like, and the header information field may occupy one byte. The service identifier field may occupy one byte. The command identifier field may occupy one byte. The service identifier field and the command identifier field determine the service instruction type of the third echo response. For example, when a value of the service identifier field is "0x04" and a value of the command identifier field is "0x02", it may indicate that the service instruction type of the third echo response is "Exchange private parameter information". The payload field includes the private parameter information.

In an embodiment of the application, when the terminal 100 and the Bluetooth device 200 exchange private parameter information, this is not limited to operation S1206 in which the terminal 100 sends a third echo request to the Bluetooth device 200 and operation S1207 in which the Bluetooth device 200 sends a third echo response to the terminal 100. The Bluetooth device 200 may further actively send the third echo request to the terminal 100, and the terminal 100 may send the third echo response to the Bluetooth device 200.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof without departing from the scope of the technical solutions of embodiments of this application.

What is claimed is:

1. A Bluetooth connection method applied to a Bluetooth system comprising a terminal and a Bluetooth device, the method comprising:
    sending, by the terminal, a service inquiry request to the Bluetooth device after the terminal and the Bluetooth device establish an asynchronous connectionless link (ACL link), wherein the service inquiry request comprises information about a service supported by the terminal;
    sending, by the Bluetooth device, a service inquiry response to the terminal in response to the service inquiry request by using logical link control and adaptation protocol (L2CAP) echo response signaling, wherein the service inquiry response comprises information about a service supported by the Bluetooth device;
    performing, by the terminal, pairing with the Bluetooth device after the terminal receives the service inquiry response sent by the Bluetooth device; and
    establishing, by the terminal, a connection based on a first service to the Bluetooth device when both the terminal and the Bluetooth device support the first service.

2. The method according to claim 1, wherein the sending the service inquiry request to the Bluetooth device comprises:
    sending, by the terminal, the service inquiry request to the Bluetooth device by using L2CAP echo request signaling.

3. The method according to claim 1, further comprising:
    when the ACL link established between the terminal and the Bluetooth device is encrypted, sending, by the Bluetooth device, first battery level information of the Bluetooth device to the terminal by using L2CAP echo request signaling; and
    displaying, by the terminal, the first battery level information after receiving the first battery level information.

4. The method according to claim 3, further comprising:
    when a battery level of the Bluetooth device satisfies a preset change, sending, by the Bluetooth device, second battery level information of the Bluetooth device to the terminal by using L2CAP echo request signaling; and
    displaying, by the terminal, the second battery level information after receiving the second battery level information.

5. The method according to claim 4, further comprising:
    after receiving the first battery level information or the second battery level information sent by the Bluetooth device, sending, by the terminal, a battery level receiving response to the Bluetooth device by using L2CAP echo response signaling, wherein the battery level receiving response is used by the Bluetooth device to confirm that the terminal has received the first battery level information or the second battery level information.

6. The method according to claim 1, further comprising:
    sending, by the terminal, a private parameter of the terminal to the Bluetooth device by using L2CAP echo request signaling or L2CAP echo response signaling, wherein the private parameter of the terminal comprises audio scene information and/or user scene information of the terminal and/or a device type of the terminal.

7. The method according to claim 1, further comprising:
    sending, by the Bluetooth device, a private parameter of the Bluetooth device to the terminal by using L2CAP echo request signaling or L2CAP echo response signaling, wherein the private parameter of the Bluetooth device comprises wearing detection information of the Bluetooth device and/or a device type of the Bluetooth device.

8. A Bluetooth system, comprising:
    a terminal, and
    a Bluetooth device; wherein
    the terminal is configured to send a service inquiry request to the Bluetooth device after the terminal and the Bluetooth device establish an asynchronous connectionless link (ACL link), wherein the service inquiry request comprises information about a service supported by the terminal;
    the Bluetooth device is configured to send a service inquiry response to the terminal in response to the received service inquiry request by using logical link control and adaptation protocol (L2CAP) echo response signaling, wherein the service inquiry response comprises information about a service supported by the Bluetooth device;
    the terminal is further configured to perform pairing with the Bluetooth device after receiving the service inquiry response; and
    the terminal is further configured to establish a connection based on a first service to the Bluetooth device when both the terminal and the Bluetooth device support the first service.

9. The Bluetooth system according to claim 8, wherein the terminal is configured to:
    send the service inquiry request to the Bluetooth device by using L2CAP echo request signaling.

10. The Bluetooth system according to claim 8, wherein the Bluetooth device is further configured to:
    when the ACL link established between the Bluetooth device and the terminal is encrypted, send first battery level information of the Bluetooth device to the terminal by using L2CAP echo request signaling; and
    the terminal is further configured to display the first battery level information after receiving the first battery level information.

11. A terminal, comprising:
    a memory;
    a touchscreen;
    a processor coupled to the memory; and
    a Bluetooth chip supporting a classic Bluetooth BR/EDR function, wherein the Bluetooth chip is configured to send a service inquiry request to a Bluetooth device after the terminal and the Bluetooth device establish an asynchronous connectionless link (ACL link), wherein the service inquiry request comprises information about a service supported by the terminal, receive a service inquiry response sent by the Bluetooth device by using logical link control and adaptation protocol (L2CAP) echo response signaling, wherein the service inquiry response comprises information about a service supported by the Bluetooth device, perform pairing with the Bluetooth device after receiving the service inquiry response, and establish a connection based on a first service to the Bluetooth device when both the terminal and the Bluetooth device support the first service.

12. The terminal according to claim 11, wherein the Bluetooth chip is configured to:

send the service inquiry request to the Bluetooth device by using L2CAP echo request signaling.

13. The terminal according to claim 11, wherein the Bluetooth chip is further configured to:

when the ACL link established between the terminal and the Bluetooth device is encrypted, receive first battery level information sent by the Bluetooth device by using L2CAP echo request signaling; and the processor is configured to: after the Bluetooth chip receives the first battery level information, indicate the touchscreen to display the first battery level information.

14. The terminal according to claim 13, wherein the Bluetooth chip is further configured to:

when a battery level of the Bluetooth device satisfies a preset change, receive second battery level information sent by the Bluetooth device by using L2CAP echo request signaling; and the processor is configured to: after the Bluetooth chip receives the second battery level information, indicate the touchscreen to display the second battery level information.

15. The terminal according to claim 14, wherein the Bluetooth chip is further configured to:

after receiving the first battery level information or the second battery level information sent by the Bluetooth device, send a battery level receiving response to the Bluetooth device by using L2CAP echo response signaling, wherein the battery level receiving response is used by the Bluetooth device to confirm that the terminal has received the first battery level information or the second battery level information.

16. The terminal according to claim 11, wherein the Bluetooth chip is further configured to:

send a private parameter of the terminal to the Bluetooth device by using L2CAP echo request signaling or L2CAP echo response signaling, wherein the private parameter of the terminal comprises audio scene information and/or user scene information of the terminal and/or a device type of the terminal.

17. The terminal according to claim 11, wherein the Bluetooth chip is further configured to:

receive a private parameter that is of the Bluetooth device and that is sent by the Bluetooth device by using L2CAP echo request signaling or L2CAP echo response signaling, wherein the private parameter of the Bluetooth device comprises wearing detection information of the Bluetooth device and/or a device type of the Bluetooth device.

* * * * *